United States Patent
Uchino et al.

(10) Patent No.: US 12,342,236 B2
(45) Date of Patent: Jun. 24, 2025

(54) TERMINAL FOR SYNCHRONIZATION WITH CANDIDATE CELL

(71) Applicant: NTT DOCOMO, INC., Tokyo (JP)

(72) Inventors: Tooru Uchino, Tokyo (JP); Tianyang Min, Tokyo (JP); Hideaki Takahashi, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 686 days.

(21) Appl. No.: 17/634,911

(22) PCT Filed: Aug. 14, 2019

(86) PCT No.: PCT/JP2019/031991
§ 371 (c)(1),
(2) Date: Feb. 11, 2022

(87) PCT Pub. No.: WO2021/029053
PCT Pub. Date: Feb. 18, 2021

(65) Prior Publication Data
US 2022/0338087 A1    Oct. 20, 2022

(51) Int. Cl.
*H04W 36/26* (2009.01)
*H04W 36/00* (2009.01)
(Continued)

(52) U.S. Cl.
CPC ....... *H04W 36/26* (2013.01); *H04W 36/0079* (2018.08); *H04W 36/362* (2023.05); *H04W 76/19* (2018.02); *H04W 76/27* (2018.02)

(58) Field of Classification Search
CPC ............. H04W 36/26; H04W 36/0079; H04W 36/362; H04W 76/27; H04W 76/19
See application file for complete search history.

(56) References Cited

U.S. PATENT DOCUMENTS

2013/0182563 A1   7/2013   Johansson et al.
2019/0254101 A1*  8/2019   Lee ................. H04W 76/22
(Continued)

FOREIGN PATENT DOCUMENTS

JP        2015-500596 A        1/2015

OTHER PUBLICATIONS

Catt, "RRC connection re-establishment and resume procedures in NR", 3GPP TSG-RAN WG2#101, R2-1801827, Athens, Greece, Feb. 26-Mar. 2, 2018. (Year: 2018).*

(Continued)

*Primary Examiner* — Brian J. Gillis
*Assistant Examiner* — Chhian (Amy) Ling
(74) *Attorney, Agent, or Firm* — Osha Bergman Watanabe & Burton LLP

(57) ABSTRACT

A terminal (200) includes: a receiving unit (220) that receives, from a source gNB (100A), configuration information of a candidate target cell subordinate to a target gNB (100B); and a control unit (240) that performs a procedure for transition to the target gNB (100B) based on the configuration information of the candidate target cell without performing a reestablishment procedure when a radio link failure occurs. The control unit (240) resumes a radio bearer suspended between the terminal (200) and the target gNB (100B) in a case of performing the procedure for transition to the target gNB (100B) based on the configuration information of the candidate target cell.

4 Claims, 32 Drawing Sheets

(51) Int. Cl.
   *H04W 36/36*   (2009.01)
   *H04W 76/19*   (2018.01)
   *H04W 76/27*   (2018.01)

(56) References Cited

U.S. PATENT DOCUMENTS

| | | | | |
|---|---|---|---|---|
| 2020/0077314 A1* | 3/2020 | Hwang | ............... | H04W 76/27 |
| 2020/0154326 A1* | 5/2020 | Deenoo | ............... | H04W 74/02 |
| 2022/0201582 A1* | 6/2022 | Eklöf | ............... | H04W 24/08 |

OTHER PUBLICATIONS

ETSI TS 136 331 V15.6.0 (Jul. 2019), LTE; Evolved Universal Terrestrial Radio Access (E-UTRA); Radio Resource Control (RRC); Protocol specification. (3GPP TS 36.331 version 15.6.0 Release 15), Total 965 Pages. (Year: 2019).*
International Search Report issued in PCT/JP2019/031991 on Mar. 24, 2020 (2 page).
Written Opinion of the International Searching Authority issued in PCT/JP2019/031991 on Mar. 24, 2020 (3 pages).
Intel Corporation; "New WID: NR mobility enhancements"; 3GPP TSG RAN Meeting #83, RP-190489; Shenzhen, China; Mar. 18-21, 2019 (5 pages).
China Telecom; "Running CR for introduction of even further mobility enhancement in E-UTRAN"; 3GPP TSG-RAN WG2 #106, R2-1907137; Reno, USA; May 13-17, 2019 (17 pages).
Office Action issued in the counterpart Chinese Application No. 201980099207.X, mailed Sep. 6, 2023 (17 pages).
Office Action issued in the counterpart Japanese Application No. 2021-539779, mailed Oct. 3, 2023 (6 pages).
Ericsson: "Conditional handover failures in NR", 3GPP TSG RAN WG2 #106, R2-1906215; Reno, US, May 13-17, 2019 (6 pages).
Samsung: "Discussion on fast RLF recovery enhancements in NR", 3GPP TSG-RAN WG2 Meeting #105bis, R2-1904392; Xi'an, China, Apr. 8-12, 2019 (4 pages).
Office Action issued in Korean Application No. 10-2022-7006594, mailed Jan. 25, 2024 (12 pages).
ETSI MCC: "Report of 3GPP TSG RAN2#106 meeting, Reno, USA", 3GPP TSG-RAN WG2 meeting #107, R2-1908601; Reno, USA, May 13-17, 2019 (295 pages).
Intel Corporation: "Failure handling on CHO", 3GPP TSG RAN WG2 Meeting #106, R2-1906286; Reno, USA, May 13-17, 2019 (3 pages).
Office Action issued in Korean Application No. 10-2022-7006594, mailed Oct. 21, 2024 (7 pages).

* cited by examiner

FIG. 9

*VarRLF-Report*

The UE variable *VarRLF-Report* includes the radio link failure information or handover failure information.

VarRLF-Report UE variable

```
-- ASN1START

VarRLF-Report-r16 ::=    SEQUENCE {
    rlf-Report-r16           RLF-Report-r16,
    plmn-IdentityList-r16    PLMN-IdentityInfoList-r16
}

-- ASN1STOP
```

FIG. 10

RRCReconfigurationComplete

The *RRCReconfigurationComplete* message is used to confirm the successful completion of an RRC connection reconfiguration.

Signalling radio bearer: SRB1 or SRB3

RLC-SAP: AM

Logical channel: DCCH

Direction: UE to Network

*RRCReconfigurationComplete message*

```
-- ASN1START
-- TAG-RRCRECONFIGURATIONCOMPLETE-START

RRCReconfigurationComplete ::=            SEQUENCE {
    rrc-TransactionIdentifier                 RRC-TransactionIdentifier,
    criticalExtensions                        CHOICE {
        rrcReconfigurationComplete                RRCReconfigurationComplete-IEs,
        criticalExtensionsFuture                  SEQUENCE {}
    }
}

RRCReconfigurationComplete-IEs ::=        SEQUENCE {
    lateNonCriticalExtension                  OCTET STRING                                OPTIONAL,
    nonCriticalExtension                      RRCReconfigurationComplete-v1530-IEs        OPTIONAL
}

RRCReconfigurationComplete-v1530-IEs ::=  SEQUENCE {
    uplinkTxDirectCurrentList                 UplinkTxDirectCurrentList,                  OPTIONAL,
    nonCriticalExtension                      RRCReconfigurationComplete-v1560-IEs        OPTIONAL
}

RRCReconfigurationComplete-v1560-IEs ::=  SEQUENCE {
    scg-Response                              CHOICE {
        nr-SCG-Response                           OCTET STRING,
        eutra-SCG-Response                        OCTET STRING
    }                                                                                     OPTIONAL,
    nonCriticalExtension                      RRCReconfigurationComplete-r16-IE
}
OPTIONAL RRCReconfigurationComplete-r16-IE ::=     SEQUENCE {
    rlf-InfoAvailable-r16                     ENUMERATED (true)                           OPTIONAL,
    nonCriticalExtension                      SEQUENCE {}                                 OPTIONAL
}

-- TAG-RRCRECONFIGURATIONCOMPLETE-STOP
-- ASN1STOP
```

FIG. 11A

RRCSetupComplete

The *RRCSetupComplete* message is used to confirm the successful completion of an RRC connection establishment.

Signalling radio bearer: SRB1
RLC-SAP: AM
Logical channel: DCCH
Direction: UE to Network

RRCSetupComplete message

```
-- ASN1START
-- TAG-RRCSETUPCOMPLETE-START

RRCSetupComplete ::=                SEQUENCE {
    rrc-TransactionIdentifier           RRC-TransactionIdentifier,
    criticalExtensions                  CHOICE {
        rrcSetupComplete                    RRCSetupComplete-IEs,
        criticalExtensionsFuture            SEQUENCE {}
    }
}

RRCSetupComplete-IEs ::=            SEQUENCE {
    selectedPLMN-Identity               INTEGER (1..maxPLMN),
    registeredAMF                       RegisteredAMF                                           OPTIONAL,
    guami-Type                          ENUMERATED {native, mapped}                             OPTIONAL,
    s-NSSAI-List                        SEQUENCE (SIZE (1..maxNrofS-NSSAI)) OF S-NSSAI          OPTIONAL,
    dedicatedNAS-Message                DedicatedNAS-Message,
    ng-5G-S-TMSI-Value                  CHOICE {
        ng-5G-S-TMSI                        NG-5G-S-TMSI,
        ng-5G-S-TMSI-Part2                  BIT STRING (SIZE (9))
    }                                                                                           OPTIONAL,
    lateNonCriticalExtension            OCTET STRING                                            OPTIONAL,
    nonCriticalExtension                RRCSetupComplete-r16-IE                                 OPTIONAL
}

RRCSetupComplete ::=                SEQUENCE {
    rlf-InfoAvailable-r16               ENUMERATED {true}                                       OPTIONAL,
    nonCriticalExtension                SEQUENCE {}                                             OPTIONAL
}

RegisteredAMF ::=                   SEQUENCE {
    plmn-Identity                       PLMN-Identity                                           OPTIONAL,
    amf-Identifier                      AMF-Identifier
}
```

FIG. 11B

-- TAG-RRCSETUPCOMPLETE-STOP
-- ASN1STOP

| RRCSetupComplete-IEs field descriptions |
|---|
| *guami-Type* <br> This field is used to indicate whether the GUAMI included is native (derived from native 5G-GUTI) or mapped (from EPS, derived from EPS GUTI) as specified in TS 24.501 [23]. |
| *ng-5G-S-TMSI-Part2* <br> The leftmost 9 bits of 5G-S-TMSI. |
| *registeredAMF* <br> This field is used to transfer the GUAMI of the AMF where the UE is registered, as provided by upper layers, see TS 23.003 [21]. |
| *selectedPLMN-Identity* <br> Index of the PLMN selected by the UE from the *plmn-IdentityList* fields included in SIB1. |

FIG. 12

*RRCReestablishmentComplete*

The *RRCReestablishmentComplete* message is used to confirm the successful completion of an RRC connection re-establishment.

Signalling radio bearer: SRB1

RLC-SAP: AM

Logical channel: DCCH

Direction: UE to Network

*RRCReestablishmentComplete* message

```
-- ASN1START
-- TAG-RRCREESTABLISHMENTCOMPLETE-START

RRCReestablishmentComplete ::=       SEQUENCE {
    rrc-TransactionIdentifier            RRC-TransactionIdentifier,
    criticalExtensions                   CHOICE {
        rrcReestablishmentComplete           RRCReestablishmentComplete-IEs,
        criticalExtensionsFuture             SEQUENCE {}
    }
}

RRCReestablishmentComplete-IEs ::=   SEQUENCE {
    lateNonCriticalExtension             OCTET STRING                                OPTIONAL,
    nonCriticalExtension                 RRCReestablishmentComplete-r16-IE           OPTIONAL
}

RRCReestablishmentComplete-r16-IE ::= SEQUENCE {
    rlf-InfoAvailable-r16                ENUMERATED {true}                           OPTIONAL,
    nonCriticalExtension                 SEQUENCE {}                                 OPTIONAL
}

-- TAG-RRCREESTABLISHMENTCOMPLETE-STOP
-- ASN1STOP
```

FIG. 13

RRCResumeComplete

The *RRCResumeComplete* message is used to confirm the successful completion of an RRC connection resumption.

Signalling radio bearer: SRB1

RLC-SAP: AM

Logical channel: DCCH

Direction: UE to Network

RRCResumeComplete message

```
-- ASN1START
-- TAG-RRCRESUMECOMPLETE-START

RRCResumeComplete ::=              SEQUENCE {
    rrc-TransactionIdentifier          RRC-TransactionIdentifier,
    criticalExtensions                 CHOICE {
        rrcResumeComplete                  RRCResumeComplete-IEs,
        criticalExtensionsFuture           SEQUENCE {}
    }
}

RRCResumeComplete-IEs ::=          SEQUENCE {
    dedicatedNAS-Message               DedicatedNAS-Message                                   OPTIONAL,
    selectedPLMN-Identity              INTEGER (1..maxPLMN)                                   OPTIONAL,
    uplinkTxDirectCurrentList          UplinkTxDirectCurrentList                              OPTIONAL,
    lateNonCriticalExtension           OCTET STRING                                           OPTIONAL,
    nonCriticalExtension               RRCResumeComplete-r16-IE                               OPTIONAL
}

RRCResumeComplete-r16-IE ::=       SEQUENCE {
    rlf-InfoAvailable-r16              ENUMERATED {true}                                      OPTIONAL,
    nonCriticalExtension               SEQUENCE {}                                            OPTIONAL
}

-- TAG-RRCRESUMECOMPLETE-STOP
-- ASN1STOP
```

| RRCResumeComplete-IEs field descriptions |
|---|
| *selectedPLMN-Identity* <br> Index of the PLMN selected by the UE from the *plmn-IdentityList* fields included in *SIB1*. |
| *uplinkTxDirectCurrentList* <br> The Tx Direct Current locations for the configured serving cells and BWPs if requested by the NW (see *reportUplinkTxDirectCurrent* in *CellGroupConfig*). |

FIG. 14

*UEInformationRequest*

The *UEInformationRequest* is the command used by NR to retrieve information from the UE.

Signalling radio bearer: SRB1 or SRB3

RLC-SAP: AM

Logical channel: DCCH

Direction: NR to UE

*UEInformationRequest message*

```
-- ASN1START
-- TAG-UEINFORMATIONREQUEST-START

UEInformationRequest-r16         ::=   SEQUENCE {
    rrc-TransactionIdentifier        RRC-TransactionIdentifier,
    criticalExtensions               CHOICE {
        c1                               CHOICE {
            ueInformationRequest-r16         UEInformationRequest-r16-IEs,
            spare3 NULL, spare2 NULL, spare1 NULL
        },
        criticalExtensionsFuture         SEQUENCE {}
    }
}

UEInformationRequest-r16-IEs     ::=   SEQUENCE {
    rlf-ReportReq-r16                BOOLEAN,
    nonCriticalExtension             SEQUENCE {}             OPTIONAL
}

-- TAG-UEINFORMATIONREQUEST-STOP
-- ASN1STOP
```

FIG. 15A

*UEInformationResponse*

The *UEInformationResponse* message is used by the UE to transfer the information requested by the NR.

Signalling radio bearer: SRB1 or SRB2 (when logged measurement information is included) or SRB3

RLC-SAP: AM

Logical channel: DCCH

Direction: UE to NR

UEInformationResponse message

```
-- ASN1START
-- TAG-UEINFORMATIONREPONSE-START

UEInformationResponse-r16 ::=         SEQUENCE {
    rrc-TransactionIdentifier         RRC-TransactionIdentifier,
    criticalExtensions                CHOICE {
        c1                                CHOICE {
            ueInformationResponse-r16       UEInformationResponse-r16-IEs,
            spare3 NULL, spare2 NULL, spare1 NULL
        },
        criticalExtensionsFuture          SEQUENCE {}
    }
}

UEInformationResponse-r16-IEs ::=     SEQUENCE {
    rlf-Report-r16                        RLF-Report-r16                  OPTIONAL,
    nonCriticalExtension                  SEQUENCE{}                      OPTIONAL
}

RLF-Report-r16 ::=                    SEQUENCE {
    measResultLastServCell-r16            MeasResultServMOList  OPTIONAL,
    measResultNeighCells-r16              SEQUENCE {
        measResultListNR                      MeasResultListNR
        measResultListEUTRA                   MeasResultListEUTRA
    }                                                                     OPTIONAL,
    locationInfo-r16                      LocationInfo-r16                OPTIONAL,
    failedPCellId-r16                     CHOICE {
        cgi-Info-r16                          CGI-InfoNR,
        pci-arfcn-r10                         SEQUENCE {
            physCellId-r16                        PhysCellId,
            ssbFrequency-r16                      ARFCN-ValueNR
        }
    }
    basicFields-r16                       SEQUENCE {
        c-RNTI-r16                            C-RNTI,
        rlf-Cause-r16                         ENUMERATED {
```

FIG. 15B

```
        timeSinceFailure-r16            t310-Expiry, randomAccessProblem,
                                        rlc-MaxNumRetx, t312-Expiry-r12),
                                        TimeSinceFailure-r16                OPTIONAL,
    }

MeasResultServMOList ::=    SEQUENCE (SIZE (1..maxNrofServingCells)) OF MeasResultServMO MeasResultServMO    SEQUENCE {
    servCellId,
        measResultServingCell       ServCellIndex,
        measResultBestNeighCell     MeasResultNR,
        OPTIONAL,                   MeasResultNR
    ...
}

MeasResultListNR-r16 ::=    SEQUENCE (SIZE (1..maxCellReport)) OF MeasResultNR

MeasResultNR    SEQUENCE {
    physCellId      PhysCellId
    measResult
        cellResults     SEQUENCE {
            resultsSSB-Cell         MeasQuantityResults             OPTIONAL,
            resultsCSI-RS-Cell      MeasQuantityResults             OPTIONAL
        },
        rsIndexResults  SEQUENCE {
            resultsSSB-Indexes      ResultsPerSSB-IndexList         OPTIONAL,
            resultsCSI-RS-Indexes   ResultsPerCSI-RS-IndexList      OPTIONAL,
        },
    cgi-Info            CGI-InfoNR                                  OPTIONAL,
    ...
}

MeasResultListEUTRA-r16 ::=   SEQUENCE (SIZE (1..maxCellReport)) OF MeasResultEUTRA MeasResultEUTRA    SEQUENCE {
    eutra-PhysCellId    PhysCellId,
    measResult          MeasQuantityResultsEUTRA,
    cgi-Info            CGI-InfoEUTRA                               OPTIONAL,
    ...
}

MeasQuantityResults ::= SEQUENCE {
    rsrp        RSRP-Range
    rsrq        RSRQ-Range
    sinr        SINR-Range
}

MeasQuantityResultsEUTRA ::=  SEQUENCE {
    rsrp        RSRP-RangeEUTRA                                     OPTIONAL,
```

FIG. 15C

```
    rsrq                    RSRQ-RangeEUTRA                                           OPTIONAL,
    sinr                    SINR-RangeEUTRA                                           OPTIONAL
}

ResultsPerSSB-IndexList::=  SEQUENCE (SIZE (1..maxNrofIndexesToReport2)) OF ResultsPerSSB-Index ResultsPerSSB-Index ::=     SEQUENCE {
    ssb-Index               SSB-Index,
    ssb-Results             MeasQuantityResults                                       OPTIONAL
}

ResultsPerCSI-RS-IndexList::= SEQUENCE (SIZE (1..maxNrofIndexesToReport2)) OF ResultsPerCSI-RS-Index ResultsPerCSI-RS-Index ::=  SEQUENCE {
    csi-RS-Index            CSI-RS-Index,
    csi-RS-Results          MeasQuantityResults                                       OPTIONAL
}

-- TAG-UEINFORMATIONREPONSE-STOP
-- ASN1STOP
```

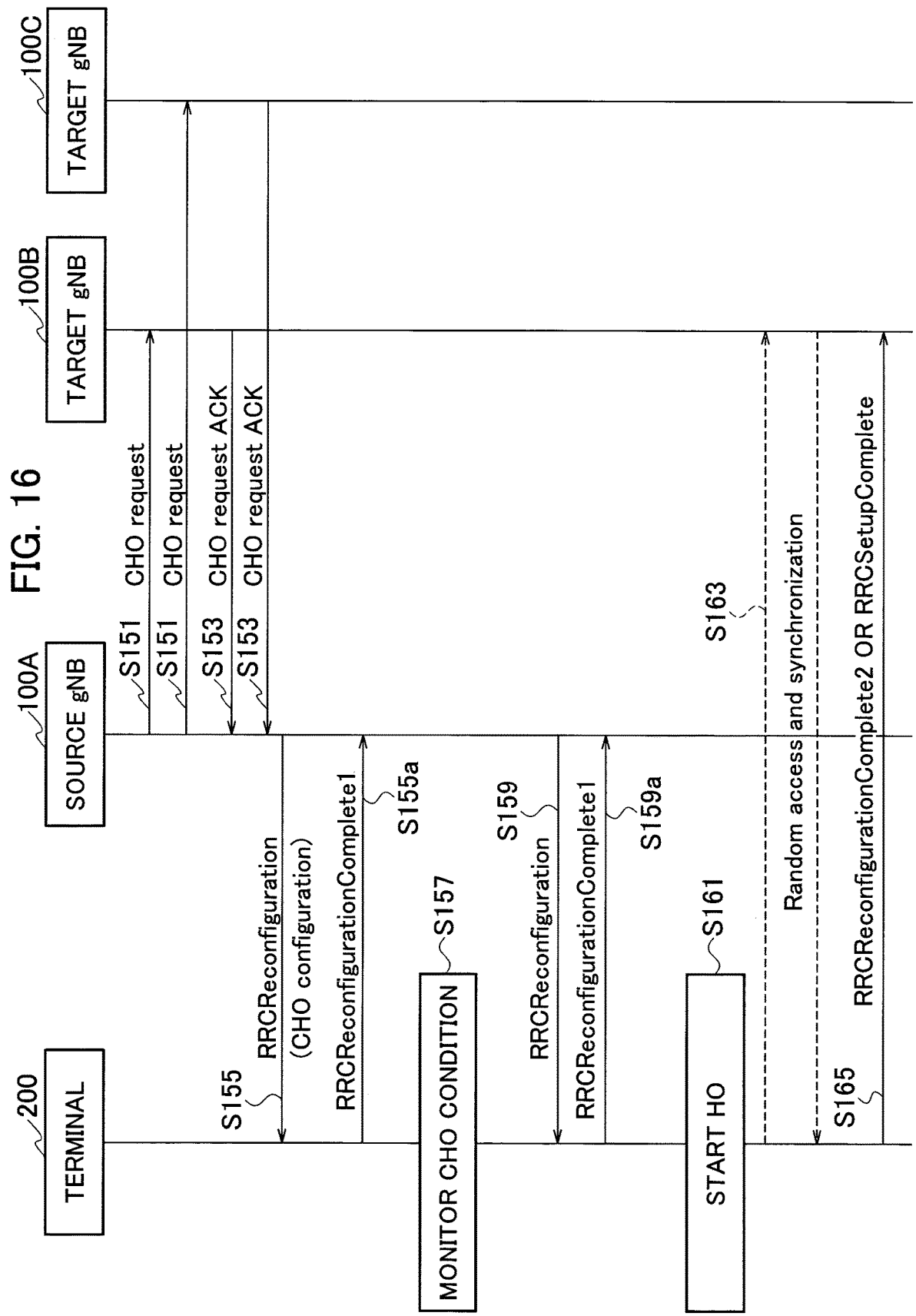

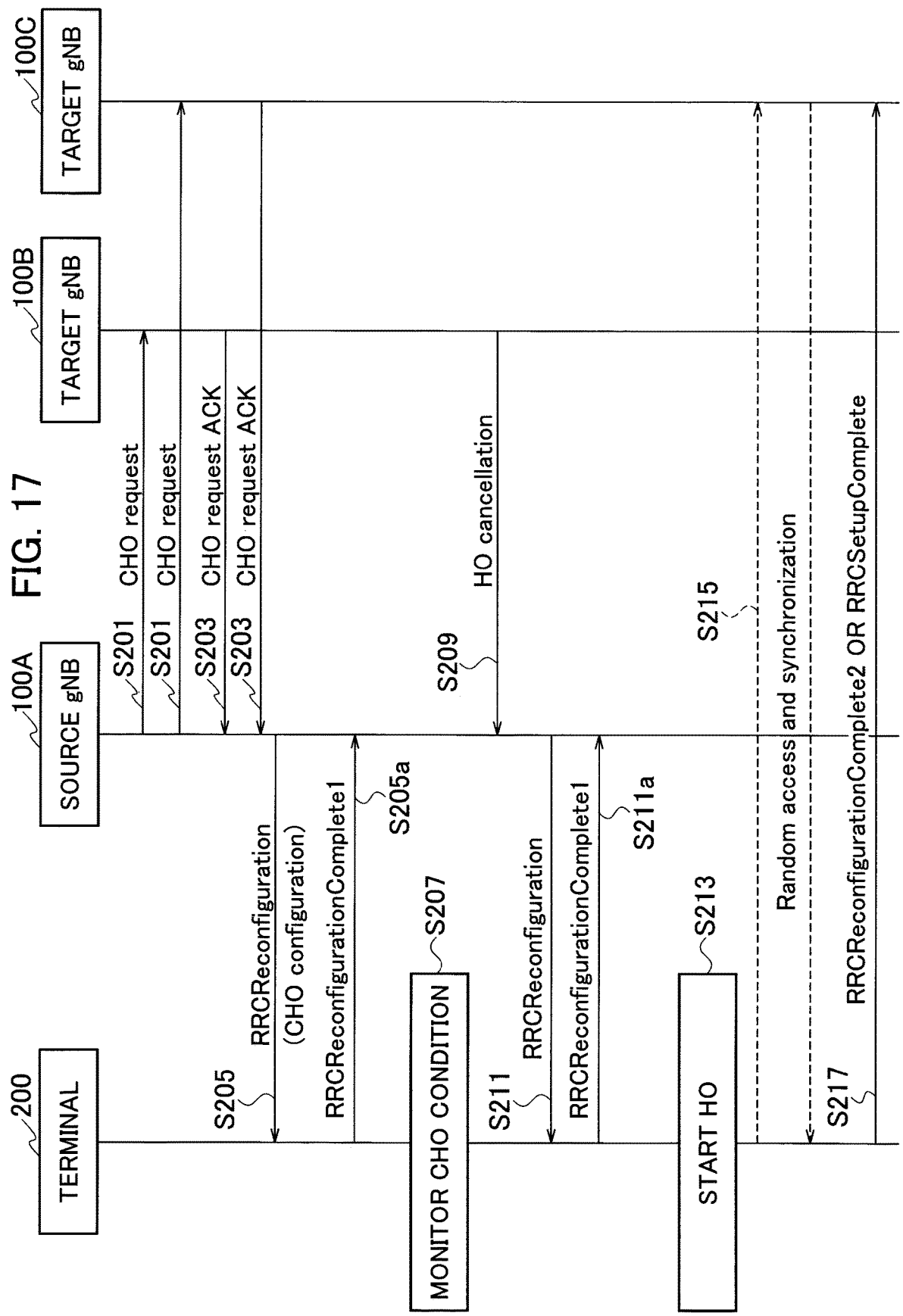

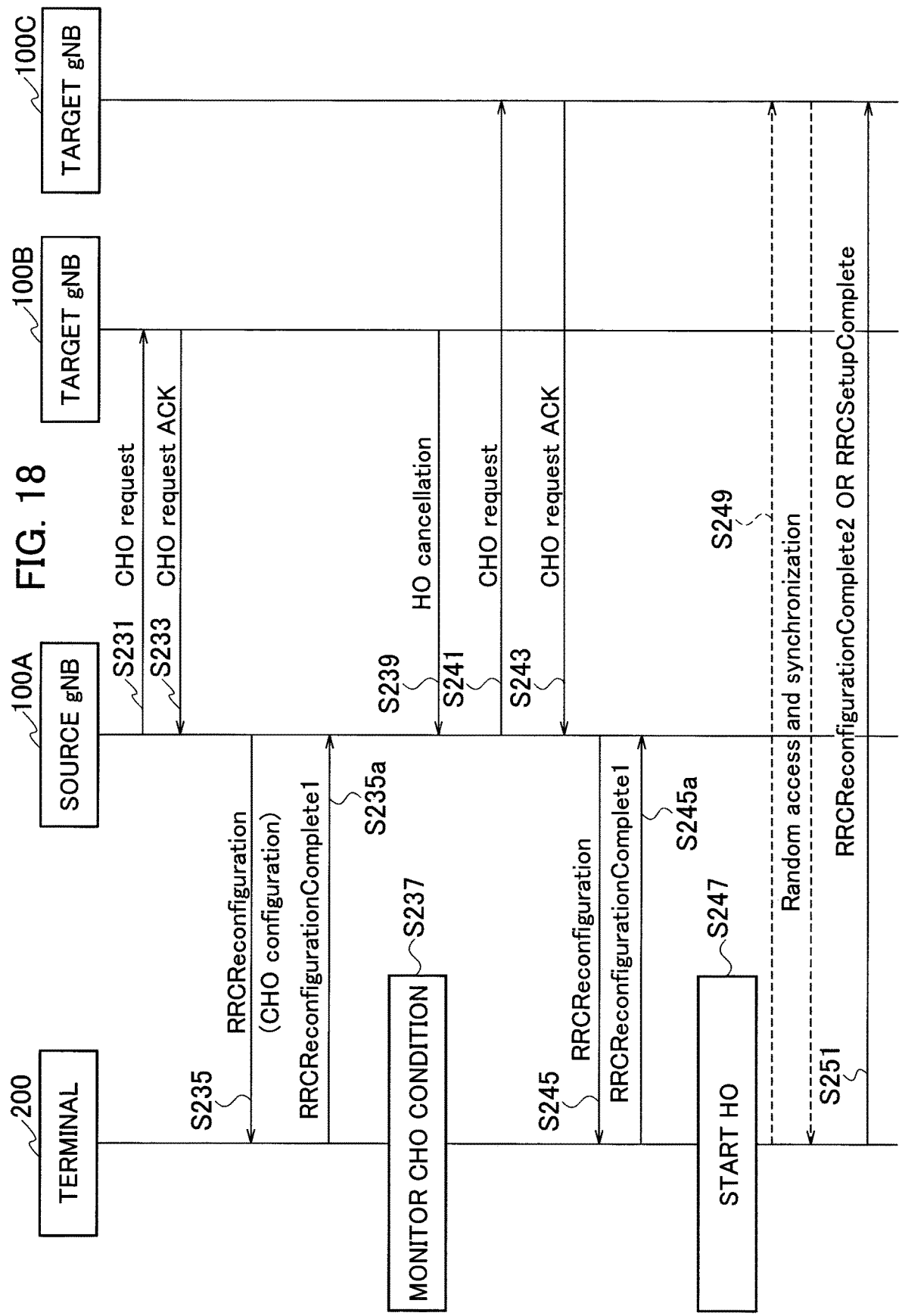

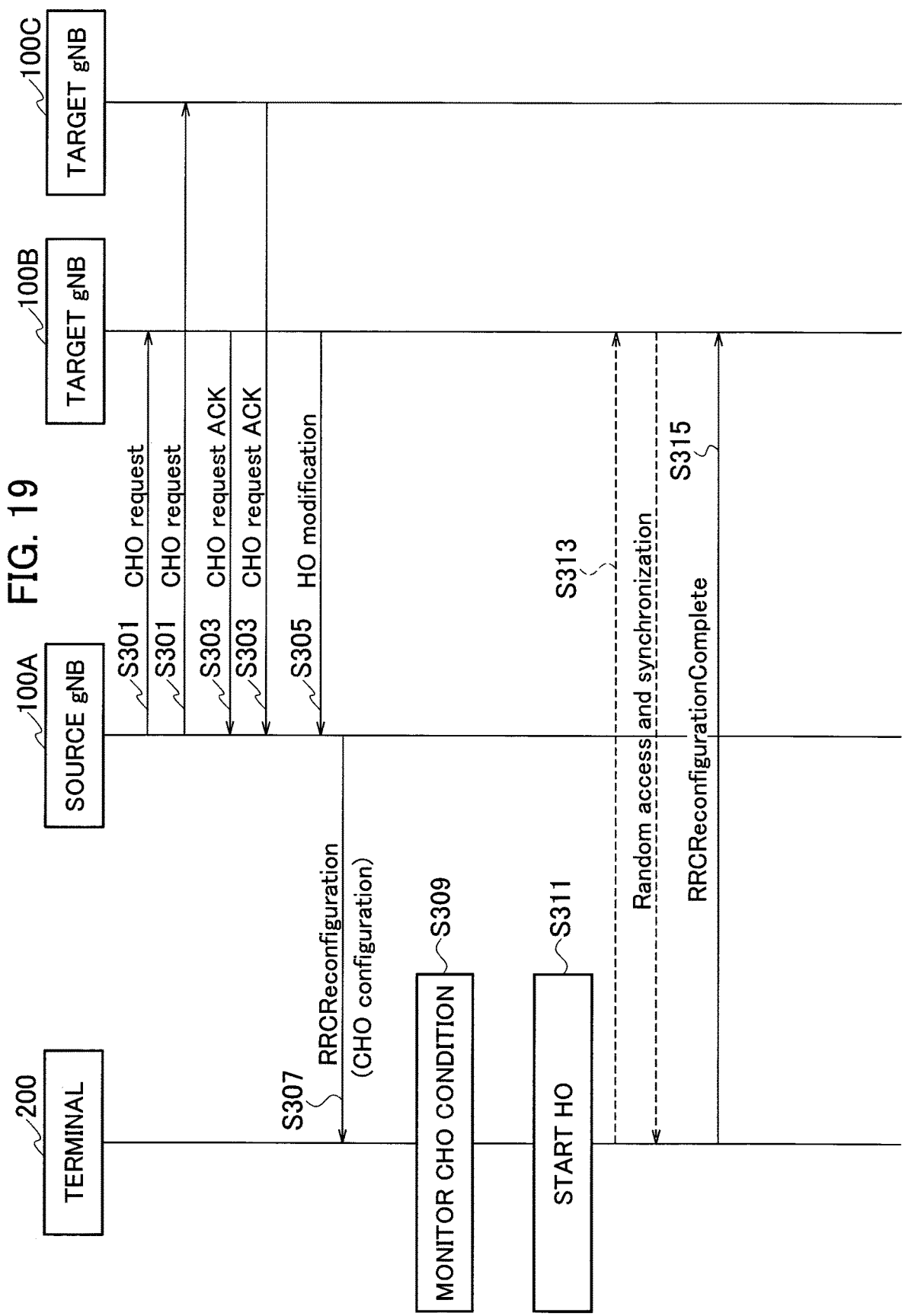

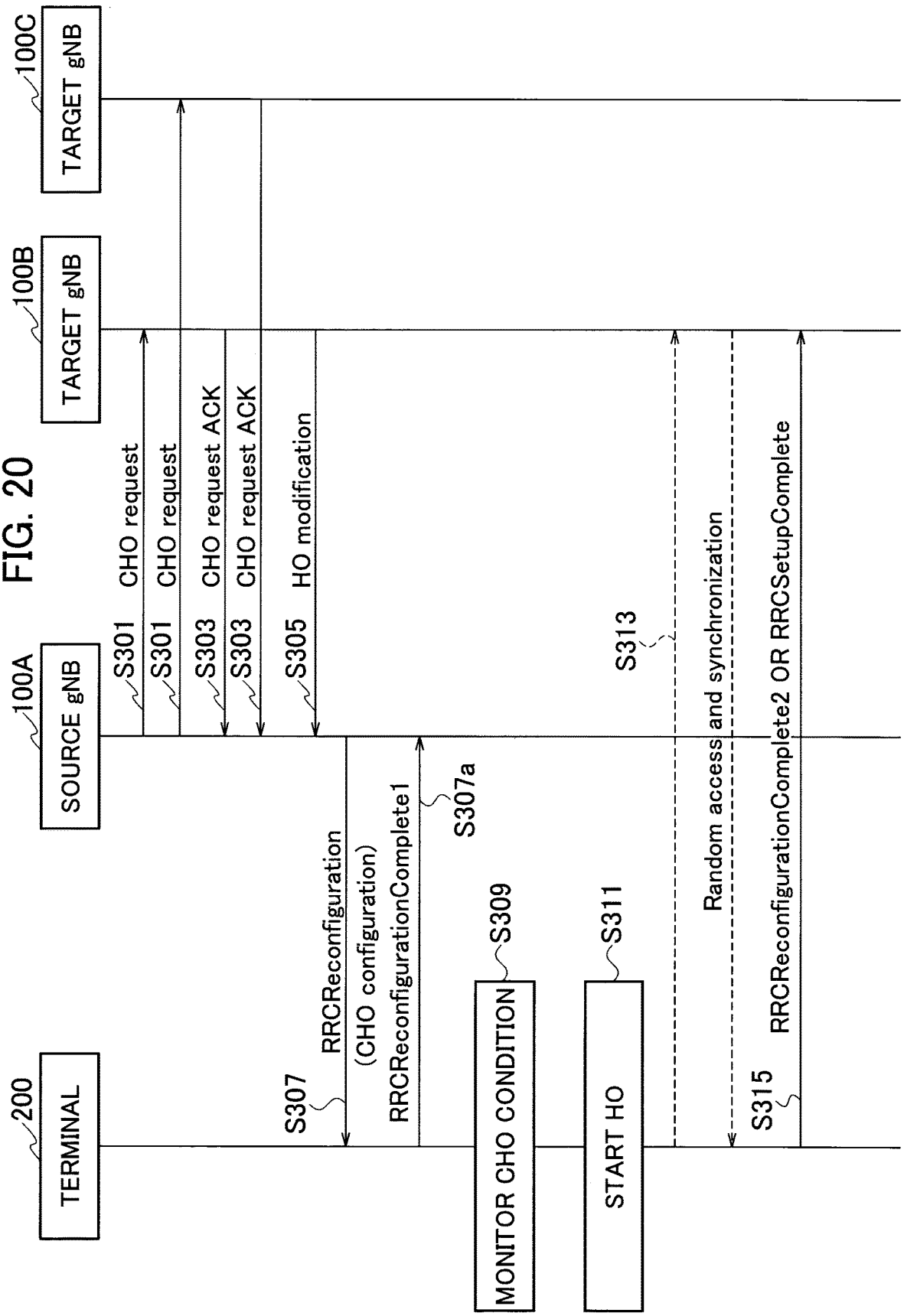

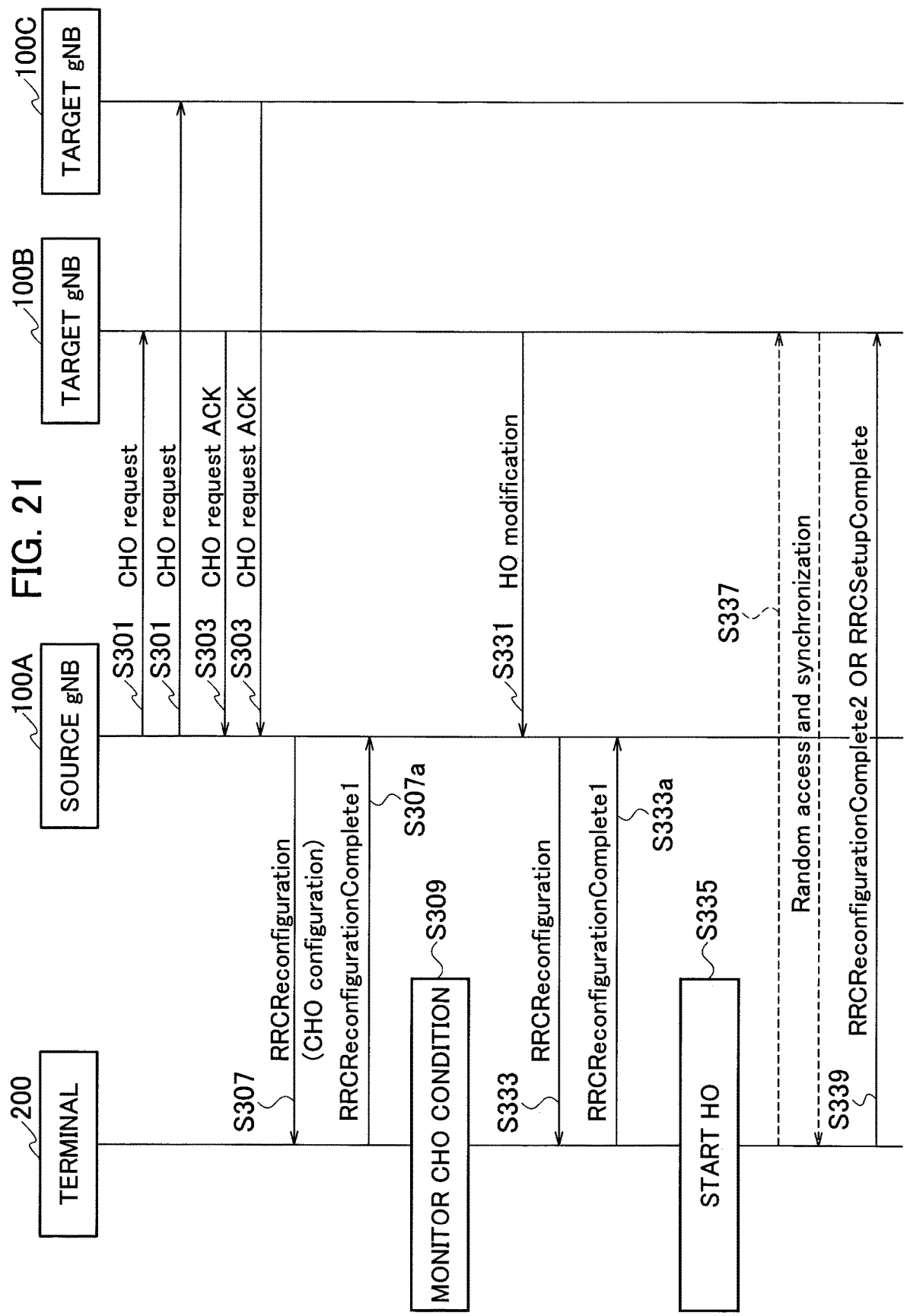

FIG. 29

Upon selecting a suitable NR cell, the UE shall:
1> ensure having valid and up to date essential system information as specified in clause 5.2.2.2;
1> stop timer T311;
1> start timer T301;
1> if T390 is running:
    2> stop timer T390 for all access categories;
    2> perform the actions as specified in 5.3.14.4;
1> apply the default L1 parameter values as specified in corresponding physical layer specifications except for the parameters for which values are provided in SIB1;
1> apply the default MAC Cell Group configuration as specified in 9.2.2;
1> apply the CCCH configuration as specified in 9.1.1.2;
1> apply the *timeAlignmentTimerCommon* included in SIB1;
1> if the suitable cell selected by the UE is one of the target cells for CHO;
    2> perform RRCReconfiguration according to 5.3.5.3;
A ⟶ 2> if RRCReconfiguration is applied; or
B ⟶ 2> if random access procedure is initiated as specified in TS 38.321[3];or
C ⟶ 2> if random access procedure is completed as specified in TS 38.321[3];or
D ⟶ 2> if a RRC message that includes indication of resumption of all suspended radio bearer is received:
        3> resume all suspended radio bearers;
    2> initiate transmission of RRCReconfigurationComplete message via SRB1 to lower layers for transmission;
1> else:
    2> initiate transmission of the *RRCReestablishmentRequest* message in accordance with 5.3.7.4;

TERMINAL FOR SYNCHRONIZATION WITH CANDIDATE CELL

TECHNICAL FIELD

The present invention relates to a terminal that transitions to a target radio base station without using a re-establishment procedure.

BACKGROUND ART

The 3rd Generation Partnership Project (3GPP) specifies Long Term Evolution (LTE) and specifies LTE-Advanced (hereinafter, collectively referred to as LTE) for the purpose of further speeding up the LTE. In addition, in the 3GPP, specification of a succession system of the LTE, called 5G or New Radio (NR), has been studied.

In a conventional handover (HO) procedure, a network determines a target radio base station (also referred to as target cell) based on quality information such as a measurement report transmitted from a terminal, and after preparation for a handover, a handover command is transmitted to the terminal.

However, when the terminal passes an appropriate handover point during the preparation for a handover on the network, the terminal transitions to the target radio base station without receiving the handover command from a source radio base station (also referred to as source cell). For this reason, there is a problem that an instantaneous interruption of a radio link can occur.

Therefore, in order to solve such a problem, a procedure called Conditional HO has been studied (Non Patent Document 1).

In the Conditional HO, a source radio base station notifies a terminal of configuration information of a candidate target cell including a candidate target cell and a transition condition to the candidate target cell, in advance.

When the transition condition to the candidate target cell is satisfied, the terminal performs a random access procedure with a target radio base station managing the candidate target cell and transitions to the target radio base station without waiting for a handover command. As a result, instantaneous interruption of a radio link can be avoided.

Furthermore, a procedure for recovering from a radio link failure (RLF) early using the Conditional HO has also been studied.

In this case, the terminal can transition to the target radio base station without performing a re-establishment procedure (RRC Reestablishment procedure) with the target radio base station, and be recovered from the RLF.

PRIOR ART DOCUMENT

Non-Patent Document

Non Patent Document 1: "New WID: NR mobility enhancements", RP-190489, 3GPP TSG RAN Meeting #83, 3GPP, March 2019

SUMMARY OF THE INVENTION

However, in a case of applying a cell transition procedure according to the Conditional HO to a recovery from an RLF, there are the following problems.

Specifically, when an RLF occurs, a radio bearer established between the terminal and the target radio base station is suspended.

In the conventional HO procedure, the terminal resumes the suspended radio bearer in the RRC reestablishment procedure performed at the time of a recovery from the RLF, but in the Conditional HO, the RRC reestablishment procedure is not performed, and thus the suspended radio bearer cannot be resumed.

In a case where the suspended radio bearer is not resumed, the terminal cannot transmit a message to the target radio base station.

The present invention has been made in view of such a situation, and an object of the present invention is to provide a terminal capable of resuming a radio bearer suspended between the terminal and a target radio base station even in a case where the terminal transitions to the target radio base station without performing a reestablishment procedure when a radio link failure occurs.

A terminal (200) according to an aspect of the present invention includes: a receiving unit (220) that receives, from a source radio base station (100A), configuration information of a cell subordinate to a target radio base station (100B); and a control unit (240) that performs a procedure for transition to the target radio base station (100B) based on the configuration information of the cell without performing a reestablishment procedure when a radio link failure occurs, wherein the control unit (240) resumes a radio bearer suspended between the terminal (200) and the target radio base station (100B) in a case of performing the procedure for transition to the target radio base station (100B) based on the configuration information of the cell.

A terminal (200) according to an aspect of the present invention includes: a receiving unit (220) that receives, from a source radio base station (100A), configuration information of a cell subordinate to a target radio base station (100B); and a control unit (240) that performs a procedure for transition to the target radio base station (100B) based on the configuration information of the cell without performing a reestablishment procedure when a radio link failure occurs, wherein the control unit (240) resumes a radio bearer suspended between the terminal (200) and the target radio base station (100B) when performing a random access procedure, in the procedure for transition to the target radio base station (100B).

A terminal (200) according to an aspect of the present invention includes: a receiving unit (220) that receives, from a source radio base station (100A), configuration information of a cell subordinate to a target radio base station (100B); and a control unit (240) that performs a procedure for transition to the target radio base station (100B) based on the configuration information of the cell without performing a reestablishment procedure when a radio link failure occurs, wherein in a case where the receiving unit (220) receives a message giving an instruction to resume a radio bearer in the procedure for transition to the target radio base station (100B), the control unit (240) resumes a radio bearer suspended between the terminal (200) and the target radio base station (100B).

BRIEF DESCRIPTION OF DRAWING

FIG. 9 is a view for describing information elements (IEs) in VarRLF-Report.

FIG. 10 is a view for describing information elements (IEs) in RRC Reconfiguration Complete.

FIG. 11A is a view for describing information elements (IEs) in RRC Setup Complete.

FIG. 11B is a view for describing information elements (IEs) in RRC Setup Complete.

FIG. 12 is a view for describing information elements (IEs) in RRC Reestablishment Complete.

FIG. 13 is a view for describing information elements (IEs) in RRC Resume Complete.

FIG. 14 is a view for describing information elements (IEs) in UE Information Request.

FIG. 15A is a view for describing information elements (IEs) in UE Information Response.

FIG. 15B is a view for describing information elements (IEs) in the UE Information Response.

FIG. 15C is a view for describing information elements (IE) in the UE Information Response.

FIG. 16 is a diagram illustrating an RRC Reconfiguration Complete transmission sequence in the Conditional HO procedure.

FIG. 17 is a diagram illustrating a HO cancellation sequence (Operation Example 1) in the Conditional HO procedure.

FIG. 18 is a diagram illustrating a HO cancellation sequence (Operation Example 2) in the Conditional HO procedure.

FIG. 19 is a diagram illustrating a HO modification sequence (Operation Example 1) in the Conditional HO procedure.

FIG. 20 is a diagram illustrating a HO modification sequence (Operation Example 2) in the Conditional HO procedure.

FIG. 21 is a diagram illustrating a HO modification sequence (Operation Example 3) in the Conditional HO procedure.

FIG. 29 is a view illustrating conditions for resuming a radio bearer after the radio link failure (RLF) in the Conditional HO procedure.

MODES FOR CARRYING OUT THE INVENTION

Figure 1:
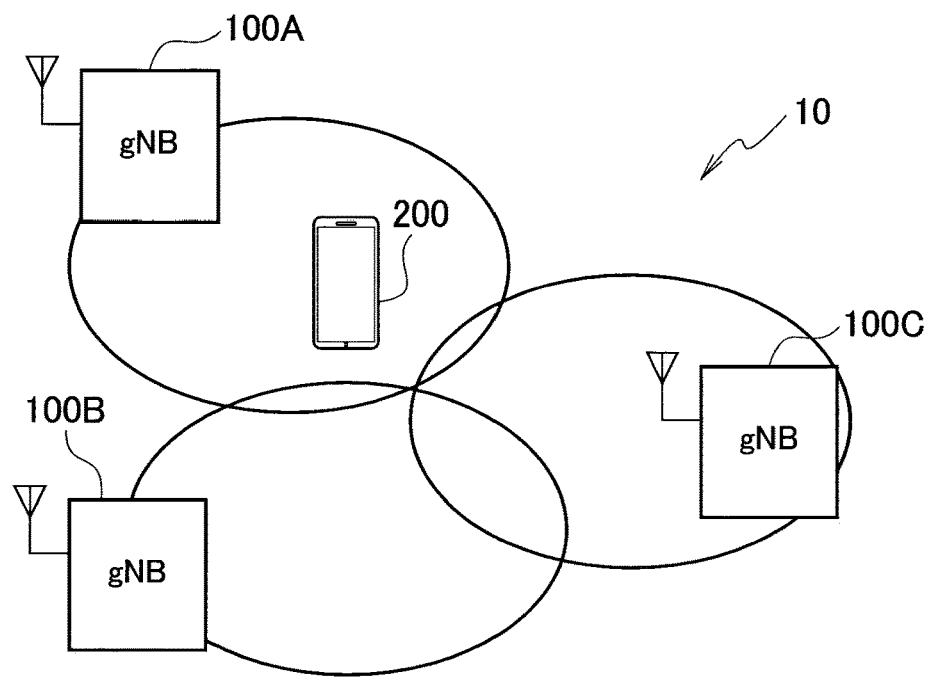
FIG. 1 is an overall schematic configuration diagram of a radio communication system 10.

Hereinafter, embodiments will be described with reference to the drawings. Note that the same functions or configurations are denoted by the same or similar reference numerals, and a description thereof is omitted as appropriate.

(1) OVERALL SCHEMATIC CONFIGURATION OF RADIO COMMUNICATION SYSTEM

FIG. 1 is an overall schematic configuration diagram of a radio communication system 10 according to the present embodiment. The radio communication system 10 is a radio communication system according to New Radio (NR), and includes a Next Generation-Radio Access Network (NG-RAN, not illustrated) and a terminal 200.

The NG-RAN includes radio base stations 100A, 100B, and 100C (hereinafter, referred to as gNBs 100A, 100B, and 100C). Note that a specific configuration of the radio communication system 10 including the number of gNBs and UEs is not limited to the example illustrated in FIG. 1.

The NG-RAN actually includes a plurality of NG-RAN Nodes, specifically, gNBs (or ng-eNBs), and is connected to a core network (5GC, not illustrated) according to the NR. Note that the NG-RAN and the 5GC may be simply expressed as a network.

Each of the gNBs 100A, 100B, and 100C is a radio base station according to the NR, and performs radio communication with the terminal 200 according to the NR. Each of the gNBs 100A, 100B, and 100C and the terminal 200 can support Massive MIMO in which a more highly directional beam is generated, carrier aggregation (CA) in which a plurality of component carriers (CCs) are bundled to be used, dual connectivity (DC) for simultaneously performing communication between a plurality of NG-RAN Nodes and a terminal, and the like, by controlling a radio signal transmitted from a plurality of antenna elements. Note that the CC is also called a carrier.

Each of the gNBs 100A, 100B, and 100C forms one or more cells and manages the one or more cells. The terminal 200 can transition between cells formed by the gNBs 100A, 100B, and 100C. Note that "transition between cells formed by the gNBs 100A, 100B, and 100C" can be expressed as "transition between the gNBs 100A, 100B, and 100C" or "transition between the radio base stations 100A, 100B, and 100C". In addition, "cells subordinate to the gNBs 100A, 100B, and 100C" means "cells formed by the gNBs 100A, 100B, and 100C".

The "transition" typically means a handover between cells, or a handover between gNBs, and can include a behavior of the terminal 200 which causes a change of a connection destination cell or a connection destination gNB, such as cell reselection.

The "target cell" typically means a transition destination cell to which the terminal 200 transitions, and can also include a cell (potential target cell) to which the terminal 200 can transition. Further, the "target gNB" typically means a transition destination gNB to which the terminal 200 transitions, and can also include a gNB (potential target gNB) to which the terminal 200 can transition. In the present embodiment, the gNBs 100B and 100C are target gNBs. Note that a cell to which a terminal can transition may also be called a candidate cell. Further, a gNB to which a terminal can transition may also be called a candidate gNB.

Meanwhile, the "source cell" means a transition source cell. The "source gNB" means a transition source gNB. In the present embodiment, the gNB 100A is a source gNB.

In the radio communication system 10, the terminal 200 performs a conditional handover (hereinafter, referred to as Conditional HO) procedure. Note that the Conditional HO procedure may be abbreviated as CHO procedure.

In the Conditional HO procedure, as described later, the source gNB 100A notifies the terminal 200, in advance, of one or more transition destination cell candidates (hereinafter, referred to as candidate target cells) to which the terminal 200 can transition. When a transition condition to a candidate target cell is satisfied, the terminal 200 performs a random access (RA) procedure with the target gNB 100B (or the target gNB 100C) managing the candidate target cell and transitions to the target gNB 100B (or the target gNB 100C) without receiving a handover command from the source gNB.

Note that the radio communication system 10 may include an Evolved Universal Terrestrial Radio Access Network (E-UTRAN) instead of the NG-RAN. In this case, the E-UTRAN includes a plurality of E-UTRAN nodes, specifically, eNBs (or en-gNBs), and is connected to a core network (evolved packet core (EPC)) according to LTE.

(2) FUNCTIONAL BLOCK CONFIGURATION OF RADIO COMMUNICATION SYSTEM

Next, a functional block configuration of the radio communication system 10 will be described. Specifically, a functional block configuration of each of the gNBs 100A, 100B, and 100C and the terminal 200 will be described. Hereinafter, only portions related to the features in the present embodiment will be described. Therefore, the gNBs 100A, 100B, and 100C and the terminal 200 have other functional blocks that are not directly related to the features in the present embodiment.

Figure 2:
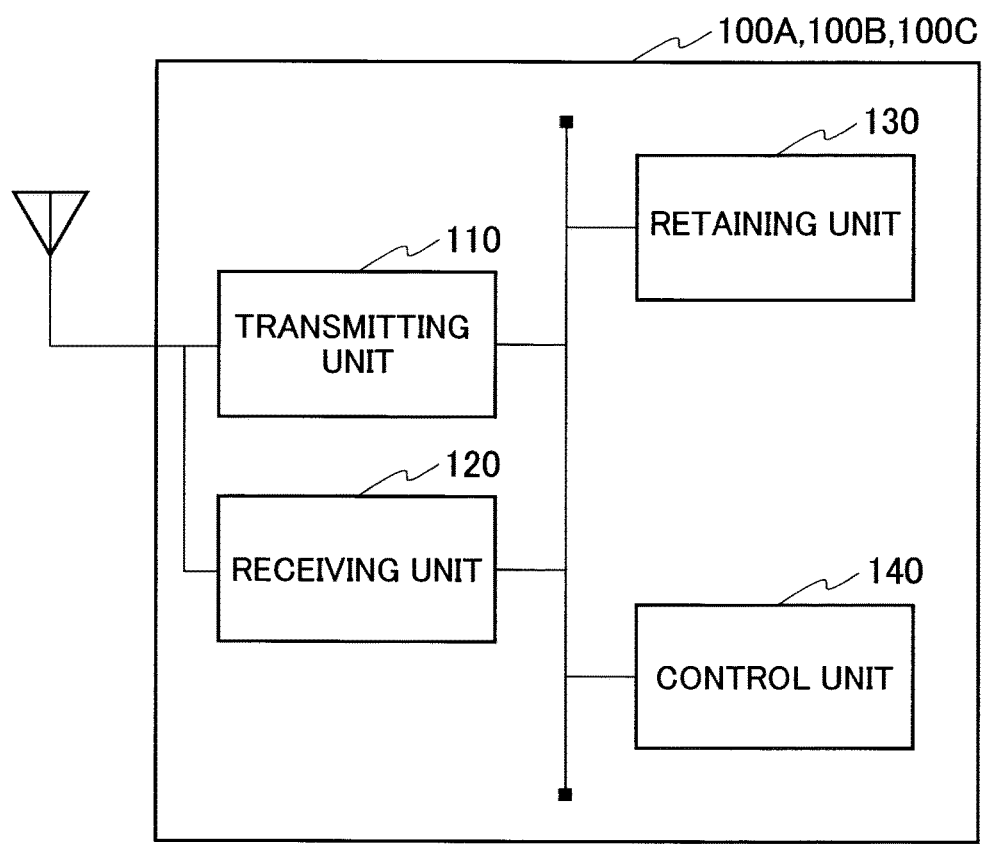
FIG. 2 is a functional block configuration diagram of each of gNBs 100A, 100B, and 100C.

FIG. 2 is a functional block configuration diagram of each of the gNBs 100A, 100B, and 100C. Since the gNBs 100A, 100B, and 100C have the same configuration, a description of the gNBs 100B and 100C is omitted. As illustrated in FIG. 2, the gNB 100A includes a transmitting unit 110, a receiving unit 120, a retaining unit 130, and a control unit 140.

The transmitting unit 110 transmits a downlink signal (DL signal) according to the NR. The receiving unit 120 receives an uplink signal (UL signal) according to the NR. Specifically, the transmitting unit 110 and the receiving unit 120 perform wireless communication with the terminal 200 on a control channel or a data channel.

The transmitting unit 110 transmits a signal according to the NR to another gNB. The receiving unit 120 receives a signal according to the NR from another gNB.

The transmitting unit 110 transmits an RRC message such as RRC Reconfiguration to be described later to the terminal 200.

In a case where the gNB 100A is a source gNB, the transmitting unit 110 transmits a CHO request to be described later to a target gNB. In a case where the gNB 100A is a target gNB, the transmitting unit 110 transmits a CHO request ACK, a HO cancellation, and HO modification to be described later to a source gNB. The CHO request ACK includes configuration information of a candidate target cell subordinate to a target gNB.

The receiving unit 120 receives, from the terminal 200, an RRC message such as RRC Reconfiguration Complete, RRC Reconfiguration Complete1, RRC Reconfiguration Complete2, RRC SetupComplete, or RRC Reestablishment Complete to be described later.

In a case where the gNB 100A is a source gNB, the receiving unit 120 receives a CHO request ACK, a HO cancellation, and a HO modification to be described later from a target gNB. In a case where the gNB 100A is a target gNB, the receiving unit 120 receives a CHO request to be described later from a source gNB.

In a case where the gNB 100A is a source gNB, the retaining unit 130 retains configuration information of a candidate target cell subordinate to a target gNB.

The control unit 140 controls each functional block included in the gNB 100A.

In a case where the gNB 100A is a target gNB, the control unit 140 determines deletion of configuration information of a candidate target cell based on a state of the candidate target cell subordinate to the gNB 100A.

In a case where the gNB 100A is a target gNB, the control unit 140 causes the transmitting unit 110 to transmit, to a source gNB, HO cancellation giving an instruction to delete the configuration information of the candidate target cell subordinate to the gNB 100A.

In a case where the gNB 100A is a target gNB, the control unit 140 causes the transmitting unit 110 to transmit, to a source gNB, a HO cancellation when the terminal 200 does not transition within a specified time based on the configuration information of the candidate target cell subordinate to the gNB 100A.

In a case where the gNB 100A is a target gNB, the control unit 140 determines modification of the configuration information of the candidate target cell based on a state of the candidate target cell subordinate to the gNB 100A.

In a case where the gNB 100A is a target gNB, the control unit 140 causes the transmitting unit 110 to transmit, to a source gNB, a HO modification giving an instruction to modify the configuration information of the candidate target cell subordinate to the gNB 100A.

In a case where the gNB 100A is a source gNB, the control unit 140 includes, in RRC Reconfiguration, a list including a plurality of pieces of configuration information of a candidate target cell subordinate to a target gNB.

Figure 3:
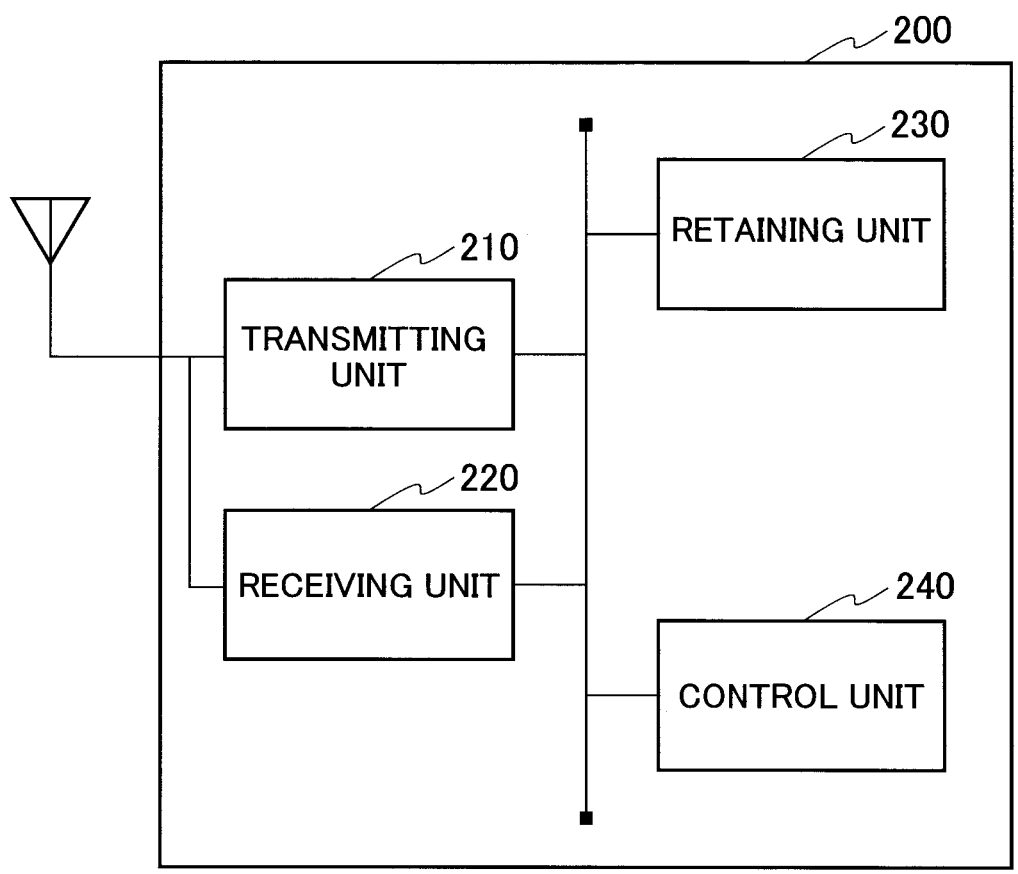
FIG. 3 is a functional block configuration diagram of a terminal 200.

FIG. 3 is a functional block configuration diagram of the terminal 200. As illustrated in FIG. 3, the terminal 200 includes a transmitting unit 210, a receiving unit 220, a retaining unit 230, and a control unit 240.

The transmitting unit 210 transmits an uplink signal (UL signal) according to the NR. The receiving unit 220 receives a downlink signal (DL signal) according to the NR. Specifically, the transmitting unit 210 and the receiving unit 220 perform wireless communication with each of the gNBs 100A to 100C on a control channel or a data channel.

The transmitting unit 210 transmits an RRC message such as RRC Reconfiguration Complete, RRC Reconfiguration Complete1, RRC Reconfiguration Complete2, RRC SetupComplete, or RRC Reestablishment Complete to be described later.

The receiving unit 220 receives an RRC message such as RRC Reconfiguration to be described later.

The retaining unit 230 retains configuration information of a candidate target cell subordinate to a target gNB. The configuration information of the candidate target cell is included in RRC Reconfiguration.

The control unit 240 controls each functional block included in the terminal 200.

The control unit 240 performs a RA procedure between the terminal 200 and a target gNB and transitions to the target gNB without performing a re-establishment procedure (RRC Reestablishment procedure) when the RLF occurs.

The control unit 240 transitions to the target gNB based on configuration information of a candidate target cell subordinate to the target gNB without performing the RRC Reestablishment procedure when the RLF occurs.

The control unit 240 performs a RA procedure between the terminal 200 and a target gNB and transitions to the target gNB without receiving a handover command based on configuration information of a candidate target cell subordinate to the target gNB.

The control unit 240 transitions to the target gNB without performing the RRC Reestablishment procedure when a handover failure (HOF) occurs.

The control unit 240 includes, in the above-described RRC message such as RRC Reconfiguration Complete, RRC Reconfiguration Complete2, RRC SetupComplete, or RRC Reestablishment Complete, RLF detection information including RLF information for notifying occurrence of the RLF, information on a cell in which the RLF is detected, information on a location of the terminal 200 that detected the RLF, and the like.

In a case where the receiving unit 220 receives RRC Reconfiguration including the configuration information of the candidate target cell, the control unit 240 causes the transmitting unit 210 to transmit RRC Reconfiguration Complete1 before the start of the RA procedure. Note that, after the transmission of RRC Reconfiguration Complete1, the receiving unit 220 receives RRC Reconfiguration including modified configuration information of a candidate target cell.

In a case where the receiving unit 220 receives configuration information of a candidate target cell subordinate to a target gNB using RRC Reconfiguration to which a transaction ID is assigned by a source gNB, the control unit 240 includes, in RRC Reconfiguration Complete1, the transaction ID. The control unit 240 causes the transmitting unit 210 to transmit the RRC Reconfiguration Complete1 to the source gNB.

In a case where the receiving unit 220 receives configuration information of a candidate target cell subordinate to a target gNB to which a transaction ID is assigned by the target gNB, the control unit 240 includes, in RRC Reconfiguration Complete2, the transaction ID. After the success of the RA procedure, the control unit 240 causes the transmitting unit 210 to transmit the RRC Reconfiguration Complete2 to the target gNB.

When the HOF occurs, the control unit 240 maintains all or part of configuration information of a candidate target cell subordinate to a target gNB shared between the terminal 200 and the target gNB, and includes, in RRC Reconfiguration Complete2, the maintained configuration information. The maintained configuration information includes security information, identification information of the terminal 200, and the like. After the success of the RA procedure, the control unit 240 causes the transmitting unit 210 to transmit the RRC Reconfiguration Complete2 to the target gNB.

When performing a procedure for transition to a target gNB, the control unit 240 resumes a radio bearer suspended between the terminal 200 and the target gNB.

In the procedure for transition to a target gNB, the control unit 240 resumes a radio bearer suspended between the terminal 200 and the target gNB when performing the RA procedure.

In the procedure for transition to a target gNB, in a case where the receiving unit 220 receives a message giving an instruction to resume a radio bearer, the control unit 240 resumes a radio bearer suspended between the terminal 200 and the target gNB.

(3) OPERATIONS OF RADIO COMMUNICATION SYSTEM

Next, operations of the radio communication system 10 will be described. Specifically, the Conditional HO procedure will be described first, and then, the following operations will be described.

Recovery from Radio Link Failure (RLF) in Conditional HO Procedure

RRC Reconfiguration Complete Transmission Timing in Conditional HO Procedure

Handover (HO) Cancellation in Conditional HO Procedure

Handover (HO) Modification in Conditional HO Procedure

Configuration of RRC Reconfiguration in Conditional HO Procedure

Assignment of Transaction Identifier (ID) in Conditional HO Procedure

Recovery from Handover Failure (HOF) in Conditional HO Procedure

Resumption of Radio Bearer after Radio Link Failure (RLF) in Conditional HO Procedure

(3.1) Conditional HO Procedure

Figure 4:
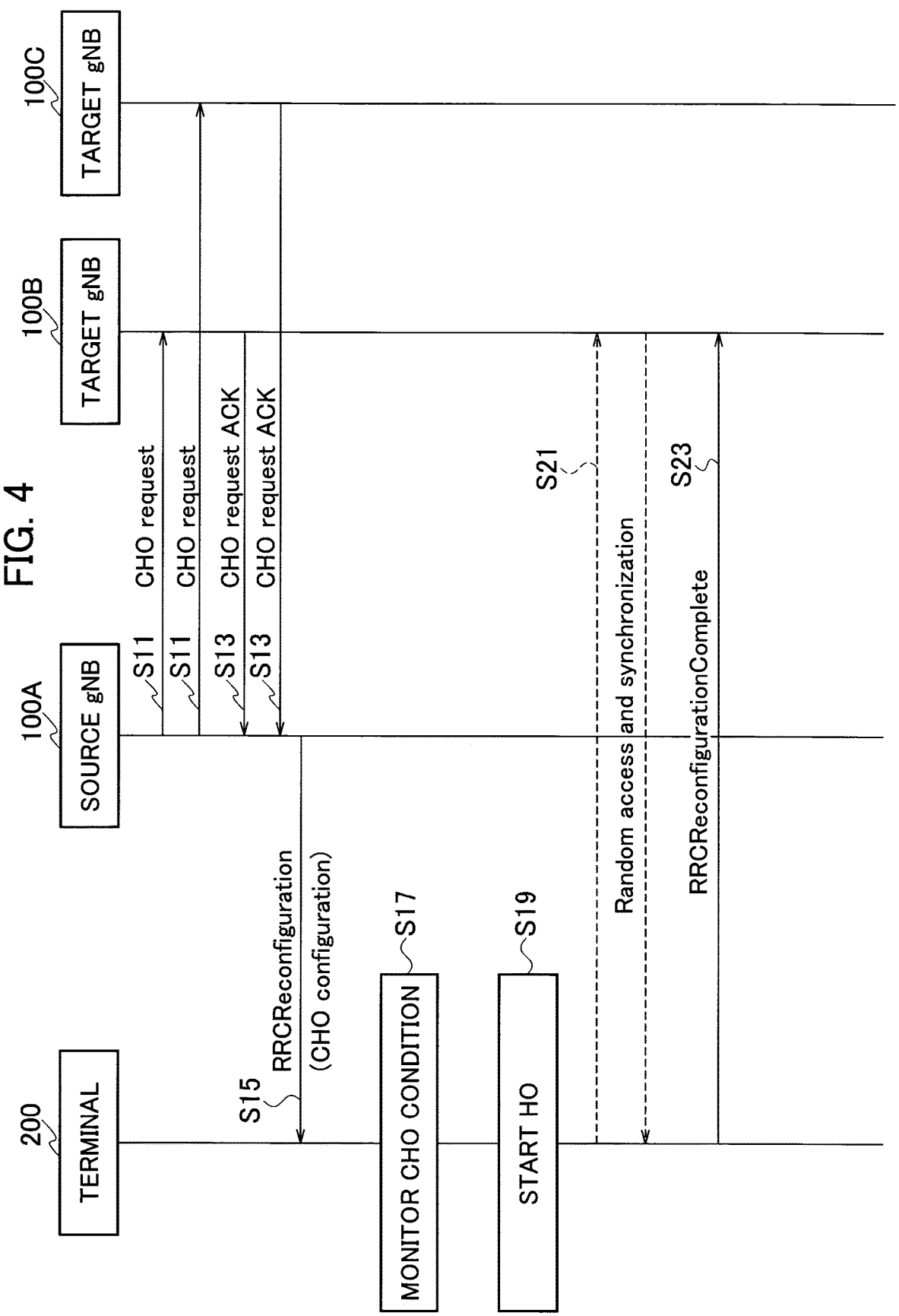
FIG. 4 is a diagram illustrating a sequence of a Conditional HO procedure.

FIG. 4 is a diagram illustrating a sequence of the Conditional HO procedure. As illustrated in FIG. 4, when the source gNB 100A finds the target gNBs 100B and 100C based on a measurement report received from the terminal 200, the source gNB 100A transmits a Conditional HO request (CHO request) to the target gNBs 100B and 100C (S11).

When the target gNB 100B receives the CHO request from the source gNB 100A, the target gNB 100B transmits, to the source gNB 100A, a CHO request response (CHO request ACK) including configuration information of a cell (referred to as candidate target cell) subordinate to the target gNB 100B (S13). The configuration information of the candidate target cell includes information on the candidate target cell and a transition condition to the candidate target cell.

Similarly, when the target gNB 100C receives the CHO request from the source gNB 100A, the target gNB 100C transmits, to the source gNB 100A, a CHO request response (CHO request ACK) including configuration information of a cell (referred to as candidate target cell) subordinate to the target gNB 100C (S13). The configuration information of the candidate target cell includes information on the candidate target cell and a transition condition to the candidate target cell.

When the source gNB 100A receives the CHO request ACK from each of the target gNBs 100B and 100C, the source gNB 100A transmits a radio resource control (RRC) reconfiguration message (RRC Reconfiguration) including a Conditional HO configuration (CHO configuration) to the terminal 200 (S15). The CHO configuration includes the configuration information of the candidate target cell transmitted from each of the target gNBs 100B and 100C.

When the terminal 200 receives the CHO configuration from the source gNB 100A, the terminal 200 monitors a Conditional HO condition (CHO condition) (S17). Specifically, the terminal 200 judges whether or not the transition condition to the candidate target cell included in the configuration information of each candidate target cell is satisfied.

In a case where the terminal 200 judges that the transition condition to the candidate target cell is satisfied due to a movement of the terminal 200 or the like, the terminal 200 determines to start a handover (HO) to the candidate target cell without receiving a handover command from the source gNB 100A (S19). In the present embodiment, the terminal 200 determines to start the HO to the candidate target cell subordinate to the target gNB 100B. A candidate target cell as a transition destination, of which a transition condition is satisfied, is also referred to as CHO cell.

Note that the source gNB 100A may receive only the information on the candidate target cell from each of the target gNBs 100B and 100C in S13. In this case, in S15, the source gNB 100A transmits, to the terminal 200, a CHO configuration including information on the candidate target cell and a condition for triggering a handover (HO) of the terminal 200.

In this case, in S17, the terminal 200 judges whether or not the condition for triggering the HO is satisfied. In a case where the terminal 200 judges that the condition for triggering the HO is satisfied due to a movement of the terminal 200 or the like, the terminal 200 determines a candidate target cell as a transition destination and starts a handover to the candidate target cell in S19. The terminal 200 determines a candidate target cell as a transition destination based on, for example, a priority of each candidate target cell given by the source gNB 100A and a cell state included in information on each candidate target cell.

When the terminal 200 determines the start of the HO to the candidate target cell subordinate to the target gNB 100B, the terminal 200 performs a random access (RA) procedure between the target gNB 100B and the terminal 200, and establishes synchronization between the target gNB 100B and the terminal 200 (S21). Thereby, the terminal 200 is connected to the target gNB 100B.

When the terminal 200 is connected to the target gNB 100B, the terminal 200 transmits an RRC reconfiguration complete message (RRC Reconfiguration Complete) to the target gNB 100B (S23).

(3.2) Recovery from RLF in Conditional HO Procedure

Next, a recovery from an RLF in the Conditional HO procedure will be described. First, a recovery from an RLF in a conventional HO procedure will be described.

Figure 5:
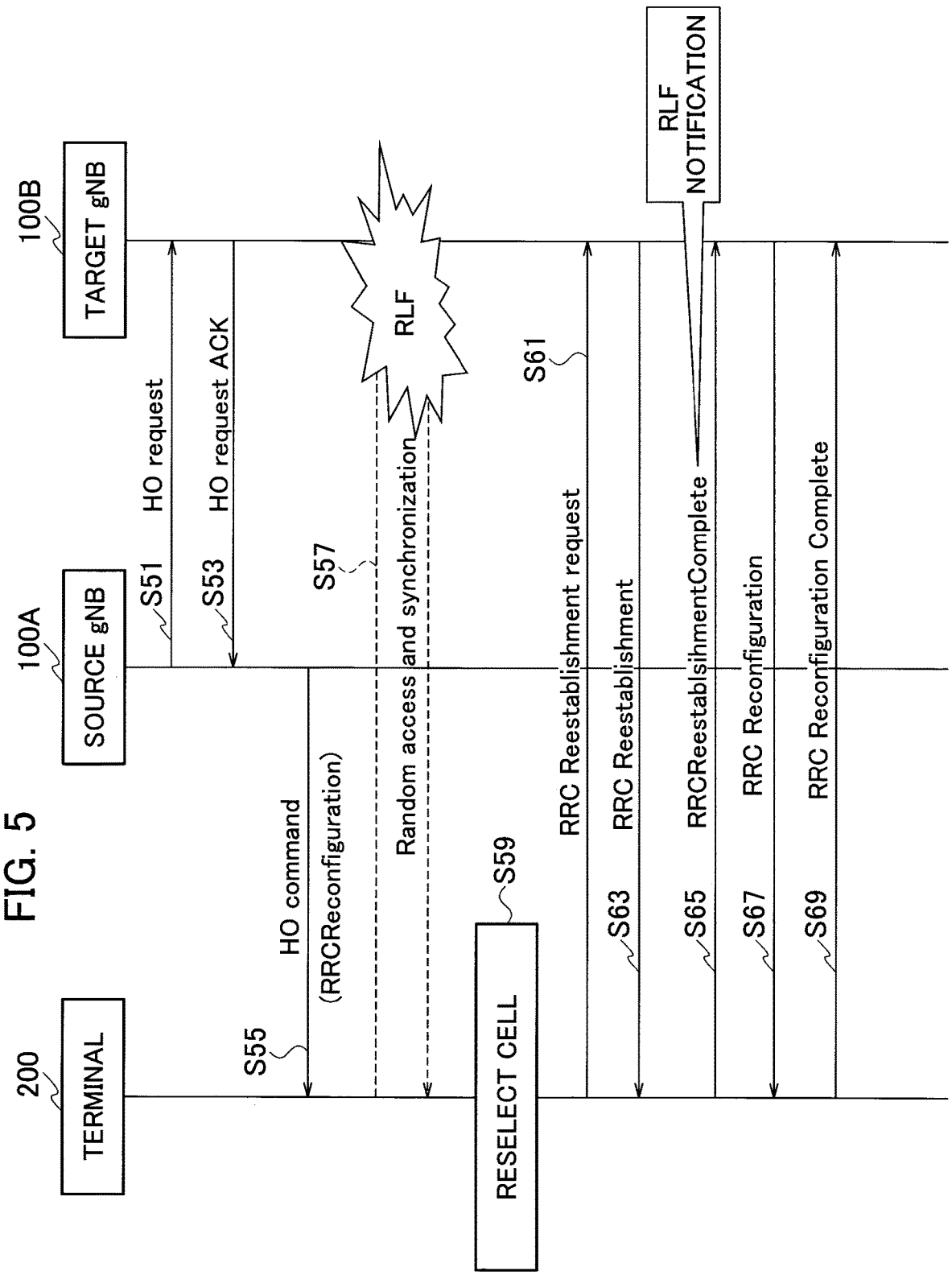
FIG. 5 is a diagram illustrating a sequence of a recovery from a radio link failure (RLF) in a conventional handover (HO) procedure.

FIG. 5 is a diagram illustrating a sequence of a recovery from an RLF in the conventional HO procedure. As illustrated in FIG. 5, when the source gNB 100A finds the target gNB 100B based on a measurement report received from the terminal 200, the source gNB 100A transmits a HO request (HO request) to the target gNB 100B (S51).

When the target gNB 100B receives the HO request from the source gNB 100A, the target gNB 100B transmits, to the source gNB 100A, a HO request response (HO request ACK) including information on a cell (referred to as target cell) subordinate to the target gNB 100B (S53).

When the source gNB 100A receives HO request ACK from the target gNB 100B, the source gNB 100A transmits an RRC reconfiguration message (RRC Reconfiguration) including a handover command (HO command) to the terminal 200 (S55). The HO command includes information on the target cell transmitted from the target gNB 100B.

When the terminal 200 receives the HO command from the source gNB 100A, the terminal 200 performs a random access (RA) procedure between the target gNB 100B and the terminal 200, and attempts to establish synchronization between the target gNB 100B and the terminal 200 (S57).

In a case where the RA procedure fails due to occurrence of an RLF during the RA procedure in S57, the terminal 200 performs cell reselection (S59). In a case where the terminal 200 determines to re-establish connection to the cell subordinate to the target gNB 100B, the terminal 200 performs an RRC Reestablishment procedure between the target gNB 100B and the terminal 200.

Specifically, the terminal 200 transmits an RRC re-establishment request message (RRC Reestablishment request) to the target gNB 100B (S61). When the target gNB 100B receives the RRC Reestablishment request from the terminal 200, the target gNB 100B transmits an RRC re-establishment message (RRC Reestablishment) to the terminal 200 (S63). RRC Reestablishment includes configuration information used to re-establish RRC connection between the target gNB 100B and the terminal 200.

When the terminal 200 receives RRC Reestablishment from the target gNB 100B, the terminal 200 re-establishes RRC connection between the target gNB 100B and the terminal 200, and transmits an RRC re-establishment complete message (RRC Reestablishment Complete) (S65).

In S65, the terminal 200 includes, in RRC Reestablishment Complete, RLF information to perform RLF notification. The RLF information is included in RRC Reestablishment Complete to notify the network of occurrence of an RLF between the terminal 200 and the target gNB 100B.

When the target gNB 100B receives RRC Reestablishment Complete from the terminal 200, the target gNB 100B transmits RRC Reconfiguration to the terminal 200 (S67). When the terminal 200 receives RRC Reconfiguration from the target gNB 100B, the terminal 200 performs reconfiguration of RRC connection, and transmits RRC Reconfiguration Complete to the target gNB 100B (S69).

(3.2.1) Operation Example 1

Next, Operation Example 1 of a recovery from an RLF in the Conditional HO procedure will be described. In the present operation example, in a case where a RA procedure fails due to occurrence of an RLF in the Conditional HO procedure, the terminal 200 reselects a candidate target cell (CHO cell) as a transition destination, performs the RA procedure, and then notifies the network of the occurrence of the RLF by using an RRC reconfiguration complete message (RRC Reconfiguration Complete).

Figure 6:
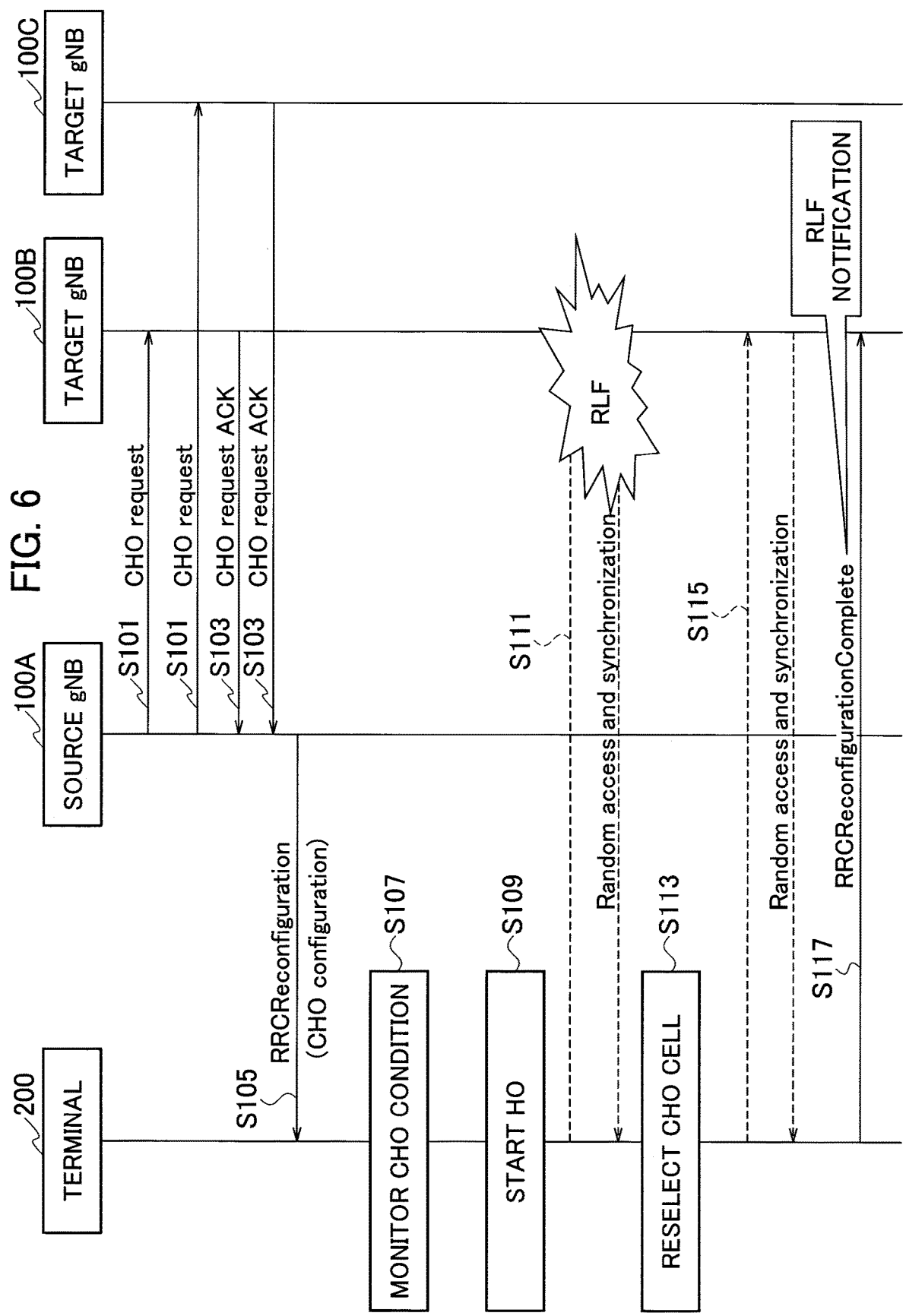
FIG. 6 is a diagram illustrating a sequence (Operation Example 1) of a recovery from a radio link failure (RLF) in the Conditional HO procedure.

FIG. 6 is a diagram illustrating a sequence (Operation Example 1) of a recovery from an RLF in the Conditional HO procedure. S101 to S109 in FIG. 6 are the same processing as S11 to S19 in FIG. 4, and thus a description thereof will be omitted.

When the terminal 200 determines the start of the HO to the candidate target cell subordinate to the target gNB 100B without receiving a handover command from the source gNB 100A, the terminal 200 performs a random access (RA) procedure between the target gNB 100B and the terminal 200, and attempts to establish synchronization between the target gNB 100B and the terminal 200 (S111).

In a case where the RA procedure fails due to occurrence of an RLF during the RA procedure in S111, the terminal 200 reselects a candidate target cell (CHO cell) as a transition destination of which a transition condition is satisfied (S113). In the present embodiment, the terminal 200 reselects the candidate target cell subordinate to the target gNB 100B.

When the terminal 200 reselects the candidate target cell subordinate to the target gNB 100B, the terminal 200 performs a random access (RA) procedure between the target gNB 100B and the terminal 200, and establishes synchronization between the target gNB 100B and the terminal 200 (S115). Thereby, the terminal 200 is connected to the target gNB 100B.

When the terminal 200 is connected to the target gNB 100B, the terminal 200 transmits an RRC reconfiguration complete message (RRC Reconfiguration Complete) to the target gNB 100B (S117).

In S117, the terminal 200 includes RLF information in RRC Reconfiguration Complete to perform RLF notification. The RLF information is included in RRC Reconfiguration Complete to notify the network of occurrence of an RLF between the terminal 200 and the target gNB 100B. For example, the RLF information is represented by one bit. In this case, for example, in a case where an RLF occurs, "1" is set as the RLF information, and in a case where an RLF does not occur, "0" is set as the RLF information.

As described above, the RLF information is included in a message indicating that the Conditional HO procedure is completed, that is, that the terminal 200 has applied the configuration information of the candidate target cell.

In S117, the terminal 200 can include the RLF information and RLF detection information in RRC Reconfiguration Complete. The RLF detection information includes, for example, at least one of cell information such as an identifier of a cell in which the RLF is detected (in the present embodiment, a cell subordinate to the target gNB 100B), information (global navigation satellite system (GNSS) information or the like) on a location of the terminal 200 where the RLF is detected, information on a radio access technology (RAT) used when the RLF is detected, information on a frequency used when the RLF is detected, information on a bandwidth part (BWP) used when the RLF is detected, and a location (global positioning system (GPS) information or the like) where the RLF is detected.

Note that, similarly to S13, the source gNB 100A may receive only the information on the candidate target cell from each of the target gNBs 100B and 100C in S103. In this case, the terminal 200 reselects a candidate target cell (CHO cell) as a transition destination based on a priority of each candidate target cell assigned by the source gNB 100A, a cell state included in information on each candidate target cell, and the like in S113.

As described above, in a case of the recovery from an RLF by using reselection of a CHO cell, the terminal 200 can transition to a target gNB without performing the RRC Reestablishment procedure, and be rapidly recovered from the RLF.

(3.2.2) Operation Example 2

Next, Operation Example 2 of a recovery from an RLF in the Conditional HO procedure will be described. In the present operation example, when the terminal 200 receives RRC Reconfiguration from the source gNB 100A in S105 in Operation Example 1, the terminal 200 immediately transmits an RRC reconfiguration complete message 1 (RRC Reconfiguration Complete 1).

Figure 7:
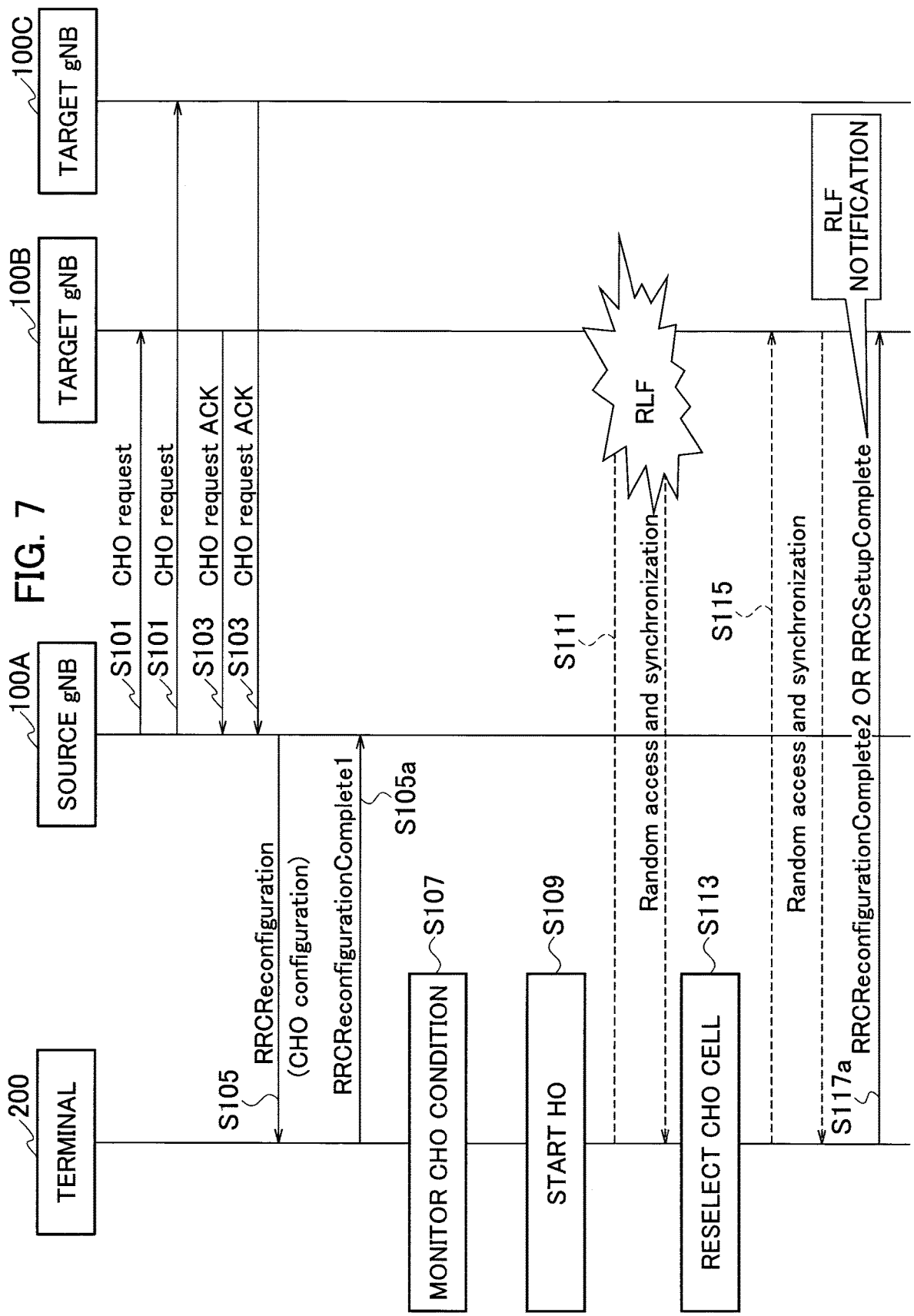
FIG. 7 is a diagram illustrating a sequence (Operation Example 2) of a recovery from a radio link failure (RLF) in the Conditional HO procedure.

FIG. 7 is a diagram illustrating a sequence (Operation Example 2) of a recovery from an RLF in the Conditional HO procedure. S101 to S115 in FIG. 7 are the same processing as S101 to S115 in FIG. 6, and thus a description thereof will be omitted.

As illustrated in FIG. 7, when the terminal 200 receives RRC Reconfiguration from the source gNB 100A, the terminal 200 immediately transmits RRC Reconfiguration Complete1 (S105a).

When the terminal 200 is connected to the target gNB 100B by the RA procedure in S115, the terminal 200 transmits, to the target gNB 100B, an RRC reconfiguration complete message 2 (RRC Reconfiguration Complete 2) or an RRC setup complete message (RRC Setup Complete) (S117a).

Note that RRC Reconfiguration Complete1 and RRC Reconfiguration Complete2 have the same configuration as that of RRC Reconfiguration Complete.

In S117a, the terminal 200 includes the RLF information in RRC Reconfiguration Complete 2 or RRC Setup Complete to perform the RLF notification. Further, in S117a, the terminal 200 can include the RLF information and the RLF detection information in RRC Reconfiguration Complete 2 or RRC Setup Complete.

(3.2.3) Operation Example 3

Next, Operation Example 3 of a recovery from an RLF in the Conditional HO procedure will be described. In the present operation example, in a case where the RA procedure fails due to occurrence of an RLF in the Conditional HO procedure in Operational Example 1, the terminal 200 reselects a transition destination cell (a transition destination cell other than the CHO cell) other than the candidate target cell, and performs the RRC Reestablishment procedure.

Figure 8:
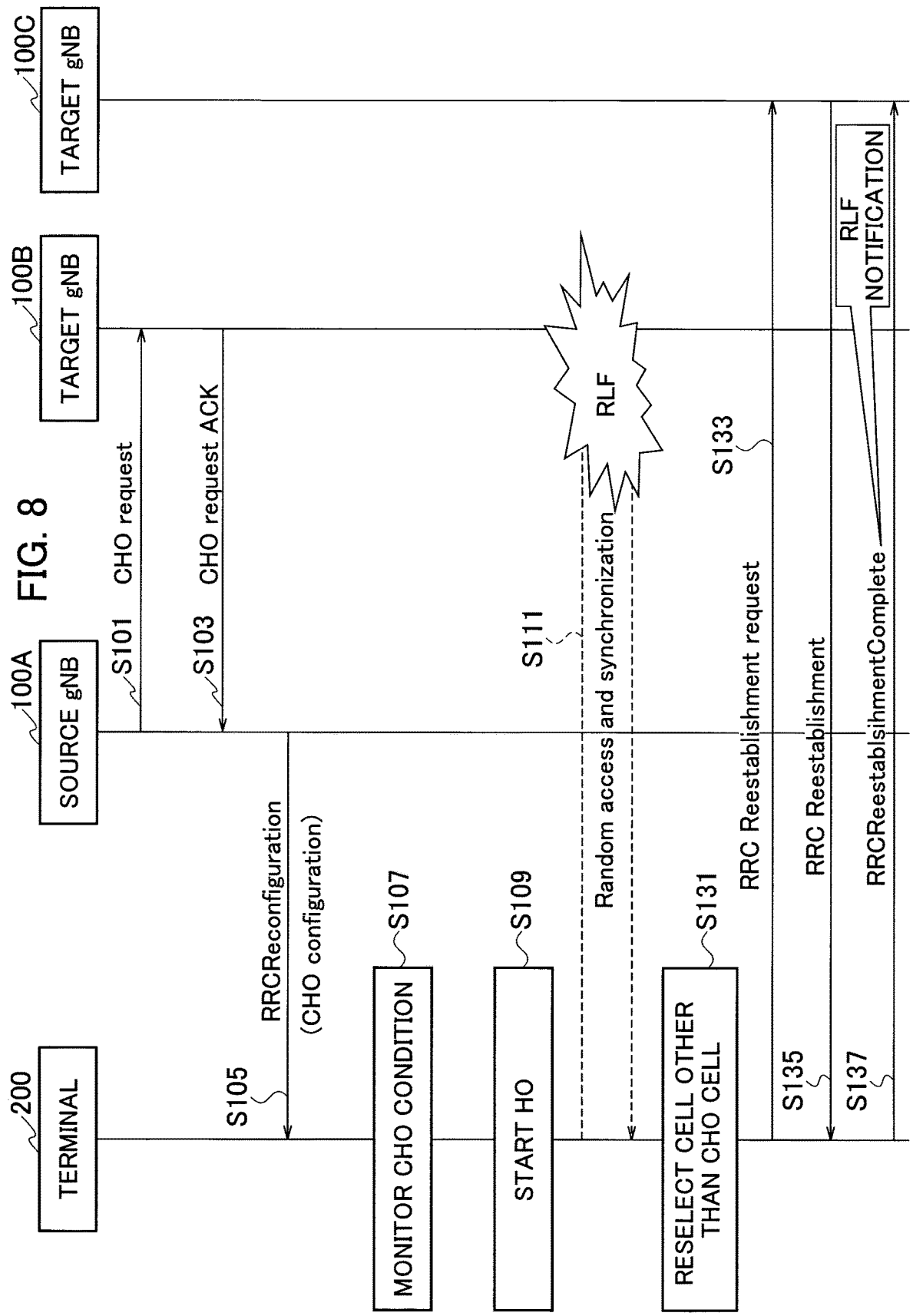
FIG. 8 is a diagram illustrating a sequence (Operation Example 3) of a recovery from a radio link failure (RLF) in the Conditional HO procedure.

FIG. 8 is a diagram illustrating a sequence (Operation Example 3) of a recovery from an RLF in the Conditional HO procedure. S101 to S111 in FIG. 8 are the same processing as S101 to S111 in FIG. 6, and thus a description thereof will be omitted.

Note that, in the present operation example, the source gNB 100A finds only the target gNB 100B based on the measurement report received from the terminal 200. Therefore, the source gNB 100A transmits a CHO request to the target gNB 100B (S101), and receives a CHO request ACK including the configuration information of the candidate target cell from the target gNB 100B (S103).

In a case where the RA procedure fails due to occurrence of an RLF during the RA procedure in S111, the terminal 200 reselects a candidate target cell (CHO cell) as a transition destination of which a transition condition is satisfied. However, in a case where there is no candidate target cell as a transition destination of which a transition condition is satisfied, the terminal 200 reselects a transition destination cell (transition destination cell other than the CHO cell) other than the candidate target cell (S131). In the present embodiment, the terminal 200 reselects a cell subordinate to the target gNB 100C.

In a case where the terminal 200 determines to re-establish connection to the cell subordinate to the target gNB 100C, the terminal 200 performs an RRC Reestablishment procedure between the target gNB 100C and the terminal 200.

Specifically, the terminal 200 transmits an RRC Reestablishment request to the target gNB 100C (S133). When the target gNB 100C receives the RRC Reestablishment request from the terminal 200, the target gNB 100C transmits RRC Reestablishment to the terminal 200 (S135). RRC Reestablishment includes configuration information to be used to re-establish RRC connection between the target gNB 100C and the terminal 200.

When the terminal 200 receives RRC Reestablishment from the target gNB 100C, the terminal 200 re-establishes RRC connection between the target gNB 100C and the terminal 200, and transmits RRC Reestablishment Complete (S137).

In S137, the terminal 200 includes the RLF information in RRC Reestablishment Complete to perform the RLF notification. Further, in S137, the terminal 200 can include the RLF information and the RLF detection information in RRC Reestablishment Complete.

(3.2.4) Information Elements (IEs)

Next, IEs of each message used for the above-described RLF notification will be described.

FIG. 9 is a view for describing IEs in VarRLF-Report. As illustrated in FIG. 9, the terminal 200 includes the RLF information in rlf-Report-r16 in VarRLF-Report. Note that the terminal 200 can include the RLF information and the RLF detection information in rlf-Report-r16 in VarRLF-Report.

FIG. 10 is a view for describing IEs in RRC Reconfiguration Complete. As illustrated in FIG. 10, in a case where the RLF information is included in VarRLF-Report, the terminal 200 includes the RLF information in rlf-InfoAvailable-r16 in RRC Reconfiguration Complete in S117 in FIG. 6. Note that the terminal 200 can include the RLF information and the RLF detection information in rlf-InfoAvailable-r16 in RRC Reconfiguration Complete.

As described above, RRC Reconfiguration Complete2 has the same configuration as that of RRC Reconfiguration Complete. Therefore, in a case where the RLF information is included in VarRLF-Report, the terminal 200 includes the RLF information in rlf-InfoAvailable-r16 in RRC Reconfiguration Complete2 in S117a in FIG. 7. Note that the terminal 200 can include the RLF information and the RLF detection information in rlf-InfoAvailable-r16 in RRC Reconfiguration Complete2.

FIGS. 11A and 11B are views for describing IEs in RRC Setup Complete. As illustrated in FIG. 11A, in a case where the RLF information is included in VarRLF-Report, the terminal 200 includes the RLF information in rlf-InfoAvailable-r16 in RRC Setup Complete in S117a in FIG. 7. Note that the terminal 200 can include the RLF information and the RLF detection information in rlf-InfoAvailable-r16 in RRC Setup Complete.

FIG. 12 is a view for describing IEs in RRC Reestablishment Complete. As illustrated in FIG. 12, in a case where the RLF information is included in VarRLF-Report, the terminal 200 includes the RLF information in rlf-InfoAvailable-r16 in RRC Reestablishment Complete in S137 in FIG. 8. Note that the terminal 200 can include the RLF information and the RLF detection information in rlf-InfoAvailable-r16 in RRC Reestablishment Complete.

FIG. 13 is a view for describing IEs in RRC Resume Complete. RRC Resume Complete is used by the terminal 200 to notify the network that resumption of a radio bearer is completed based on reception of an RRC message giving an instruction to resume a radio bearer, as described in "(3.9) Resumption of Radio Bearer after RLF in Conditional HO Procedure" to be described later.

As illustrated in FIG. 13, in a case where the RLF information is included in VarRLF-Report, the terminal 200 can include the RLF information in rlf-InfoAvailable-r16 in RRC Resume Complete to be used to notify that resumption of a radio bearer is completed after the recovery from the RLF. Note that the terminal 200 can include the RLF information and the RLF detection information in rlf-InfoAvailable-r16 in RRC Resume Complete.

FIG. 14 is a view for describing information elements (IEs) in UE Information Request. The terminal 200 can notify the network of occurrence of an RLF based on a request from the network. As illustrated in FIG. 14, the network requests the terminal 200 for the RLF notification by using rlf-ReportReq-r16 in UE Information Request.

FIGS. 15A to 15C are views for describing IEs in UE Information Response. In a case where the terminal 200 is requested by the network for the RLF notification using UE Information Request, the terminal 200 includes the RLF information in rlf-Cause-r16 in UE Information Response as illustrated in FIG. 15A. Note that the terminal 200 can include the RLF information and the RLF detection information in rlf-Cause-r16 in UE Information Response.

(3.2.5) Others

In Operation Examples 1 and 2, the message including the RLF information is a message indicating that the Conditional HO procedure is completed, that is, a message indicating that the configuration information of the candidate target cell is applied (for example, RRC Reconfiguration Complete, RRC Reconfiguration Complete 2, or RRC Setup Complete), but the present disclosure is not limited thereto.

For example, the message including the RLF information may be the first RRC message transmitted to a target gNB as a transition destination. Further, the message including the RLF information may be a message having a specific identifier. The identifier can be a transaction identifier, a packet data convergence protocol (PDCP) sequence number (SN), a PDCP count value, a radio link control (RLC) sequence number (SN), or a hybrid automatic repeat request process (HARQ process) identifier.

Further, the terminal 200 may notify the network of the RLF information at a timing other than the Conditional HO procedure.

In Operation Examples 1 to 3, the terminal 200 includes the RLF information and the RLF detection information in the same message. However, the present disclosure is not limited thereto, and the information can be included in different messages. Further, the terminal 200 can include the RLF information in a message when instructed by the network. Similarly, the terminal 200 can include the RLF detection information in a message when instructed by the network.

In a case where a plurality of RLFs occur, the terminal 200 may include a plurality of pieces of RLF detection information in the same message and transmit the message to a target gNB as a transition destination. Further, the terminal 200 may include only a predetermined number of pieces of RLF detection information (for example, one piece of RLF detection information) in the same message and transmit the message to a target gNB as a transition destination.

In a case where a plurality of RLFs occur, the terminal 200 may assign a priority to a plurality of pieces of RLF detection information. For example, in a case where the terminal 200 detects an RLF at the same frequency as that used in a cell subordinate to a target gNB as a transition destination, the terminal 200 assigns a high priority to RLF detection information including information on the frequency. Further, the terminal 200 may transmit a plurality of pieces of RLF detection information to the target gNB as a transition destination according to a priority specified by the network.

Further, when a plurality of pieces of RLF detection information are included in the same message, if the message exceeds a maximum size allowed, the terminal 200 may delete some of the RLF detection information from the message. In this case, the terminal 200 may notify the target gNB as a transition destination that some pieces of the RLF detection information are deleted.

Furthermore, in a case where the RLF is detected again after creating a message including a plurality of pieces of RLF detection information, the terminal 200 may re-create the message.

(3.3) RRC Reconfiguration Complete Transmission Timing in Conditional HO Procedure Next, an RRC Reconfiguration Complete transmission timing in the Conditional HO procedure will be described. In the Conditional HO procedure illustrated in FIG. 4, the terminal 200 transmits RRC Reconfiguration Complete in a case where the RA procedure succeeds. On the other hand, in this operation, when the terminal 200 receives RRC Reconfiguration, the terminal 200 immediately transmits RRC Reconfiguration Complete. That is, the terminal 200 transmits RRC Reconfiguration Complete before starting the RA procedure.

FIG. 16 is a diagram illustrating an RRC Reconfiguration Complete transmission sequence in the Conditional HO procedure. S151 to S155 in FIG. 16 are the same processing as S11 to S15 in FIG. 4, and thus a description thereof will be omitted.

When the terminal 200 receives RRC Reconfiguration including a CHO configuration from the source gNB 100A, the terminal 200 immediately acquires configuration information of a candidate target cell and transmits RRC Reconfiguration Complete1 to the source gNB 100A (S155*a*).

When the terminal 200 transmits RRC Reconfiguration Complete1 to the source gNB 100A, the terminal 200 monitors a CHO condition (S157). Specifically, the terminal 200 judges whether or not the transition condition to the candidate target cell included in the configuration information of each candidate target cell is satisfied.

In a case where RRC processes are performed in parallel, processing on a radio base station becomes complicated. Therefore, in a case of modifying the configuration information of the candidate target cell, the terminal 200 needs to notify the modification by using RRC Reconfiguration after receiving RRC Reconfiguration Complete for notifying that reconfiguration of RRC connection is completed.

Therefore, in a case of modifying the configuration information of the candidate target cell, the source gNB 100A notifies the terminal 200 of the modification of the configuration information of the candidate target cell by using RRC Reconfiguration after receiving RRC Reconfiguration Complete1 from the terminal 200 in S155*a* (S159).

In S159, the source gNB 100A includes the modified configuration information of the candidate target cell in RRC Reconfiguration. Note that the source gNB 100A may include, in new RRC Reconfiguration, a difference between the modified configuration information of the candidate target cell and the configuration information of the candidate target cell transmitted in S155.

RRC Reconfiguration transmitted in S155 is also referred to as a first configuration message. RRC Reconfiguration Complete1 transmitted in S155*a* is also referred to as a complete message to the first configuration message. RRC Reconfiguration transmitted in S159 is also referred to as a second configuration message.

When the terminal 200 receives RRC Reconfiguration from the source gNB 100A, the terminal 200 immediately acquires the modified configuration information of the candidate target cell, and then transmits RRC Reconfiguration Complete1 to the source gNB 100A (S159*a*). The terminal 200 updates the configuration information of the candidate target cell acquired in S155 based on the modified configuration information of the candidate target cell.

In a case where the terminal 200 judges that the transition condition to the candidate target cell is satisfied due to a movement of the terminal 200 or the like, the terminal 200 determines to start a handover (HO) to the candidate target cell without receiving a handover command from the source gNB 100A (S161). In the present embodiment, the terminal 200 determines to start the HO to the candidate target cell subordinate to the target gNB 100B.

When the terminal 200 determines the start of the HO to the candidate target cell subordinate to the target gNB 100B, the terminal 200 performs a random access (RA) procedure between the target gNB 100B and the terminal 200, and establishes synchronization between the target gNB 100B and the terminal 200 (S163). Thereby, the terminal 200 is connected to the target gNB 100B.

When the terminal 200 is connected to the target gNB 100B, the terminal 200 transmits RRC Reconfiguration Complete2 or RRC Setup Complete to the target gNB 100B (S165).

Note that, in S159, the source gNB 100A transmits RRC Reconfiguration to the terminal 200 in order to modify the configuration information of the candidate target cell, but the present disclosure is not limited thereto. For example, the source gNB 100A may also transmit RRC Reconfiguration to the terminal 200 in order to modify a configuration (UE configuration) of the terminal 200 in addition to the configuration information of the candidate target cell.

In this case, the source gNB 100A includes the modified UE configuration in RRC Reconfiguration. Note that the source gNB 100A may include, in RRC Reconfiguration, a difference between the modified UE configuration and the previously transmitted UE configuration.

(3.4) HO Cancellation in Conditional HO Procedure

Next, a HO cancellation in the Conditional HO procedure will be described. In this operation, a target gNB instructs a source gNB to delete configuration information of a candidate target cell after transmitting the configuration information of the candidate target cell to the source gNB. In the present embodiment, the target gNB 100B instructs the source gNB 100A to delete the configuration information of the candidate target cell.

(3.4.1) Operation Example 1

First, Operation Example 1 of a HO cancellation in the Conditional HO procedure will be described. FIG. 17 is a diagram illustrating a HO cancellation sequence (Operation Example 1) in the Conditional HO procedure. S201 to S207 illustrated in FIG. 17 are the same processing as S151 to S157 illustrated in FIG. 16, and thus a description thereof will be omitted.

Note that a CHO request ACK transmitted in S203 is also referred to as a first message. A HO cancellation transmitted in S209 is also referred to as a second message.

In a case where the target gNB 100B identifies that a candidate target cell subordinate to the target gNB 100B is in a state unsuitable for transition of the terminal 200, the target gNB 100B transmits a HO deletion message (HO cancellation) to the source gNB 100A (S209).

Specifically, the target gNB 100B may transmit a HO cancellation in S209 in a case where the target gNB 100B determines that a load increases in the candidate target cell subordinate to the target gNB 100B and the candidate target cell is in a state unsuitable for transition of the terminal 200.

In this case, when a large number of terminals transition to the candidate target cell subordinate to the target gNB 100B, and the number of connected terminals exceeds a maximum number of connected terminals allowed by the candidate target cell, the target gNB 100B may determine that the candidate target cell is in a state unsuitable for transition of the terminal 200.

For example, in call admission control (CAC), in a case where the number of connected terminals exceeds a maximum number of UE contexts in the candidate target cell subordinate to the target gNB 100B, the target gNB 100B determines that the candidate target cell is in a state unsuitable for transition of the terminal 200.

Further, in a case where the terminal 200 does not transition to the candidate target cell within a specified time based on the configuration information of the candidate target cell subordinate to the target gNB 100B, (for example, in a case where the terminal 200 is still in an inactive state beyond the specified time), the target gNB 100B may transmit a HO cancellation in S209.

Furthermore, in a case where the target gNB 100B receives UE context release from a gNB or ng-eNB other than the source gNB, the target gNB 100B may transmit a HO cancellation in S209.

Note that, in S209, the target gNB 100B may directly transmit a HO cancellation to the source gNB 100A. In this case, for example, Xn signaling is used for transmission of a HO cancellation. Alternatively, the target gNB 100B may transmit a HO cancellation to the source gNB 100A via the core network. In this case, for example, NG signaling is used for transmission of a HO cancellation.

When the source gNB 100A receives a HO cancellation from the target gNB 100B, the source gNB 100A notifies the terminal 200 of the modification of the configuration information of the candidate target cell by using RRC Reconfiguration after receiving RRC Reconfiguration Complete1 from the terminal 200 in S205a (S211).

Specifically, the source gNB 100A includes, in RRC Reconfiguration, information giving an instruction to delete the configuration information of the candidate target cell subordinate to the target gNB 100B. Note that the source gNB 100A may include, in RRC Reconfiguration, a CHO configuration from which the configuration information of the candidate target cell subordinate to the target gNB 100B is deleted.

When the terminal 200 receives RRC Reconfiguration from the source gNB 100A, the terminal 200 immediately transmits RRC Reconfiguration Complete1 to the source gNB 100A (S211a). The terminal 200 deletes the configuration information of the candidate target cell subordinate to the target gNB 100B based on the reception of RRC Reconfiguration.

In a case where the terminal 200 judges that the transition condition to the candidate target cell is satisfied due to a movement of the terminal 200 or the like, the terminal 200 determines to start a handover (HO) to the candidate target cell without receiving a handover command from the source gNB 100A (S213). In the present embodiment, the terminal 200 determines to start the HO to the candidate target cell subordinate to the target gNB 100C.

When the terminal 200 determines the start of the HO to the candidate target cell subordinate to the target gNB 100C, the terminal 200 performs a random access (RA) procedure between the target gNB 100C and the terminal 200, and establishes synchronization between the target gNB 100C and the terminal 200 (S215). Thereby, the terminal 200 is connected to the target gNB 100C.

When the terminal 200 is connected to the target gNB 100C, the terminal 200 transmits RRC Reconfiguration Complete2 or RRC Setup Complete to the target gNB 100C (S217).

(3.4.2) Operation Example 2

Next, Operation Example 2 of HO cancellation in the Conditional HO procedure will be described. FIG. 18 is a diagram illustrating a HO cancellation sequence (Operation Example 2) in the Conditional HO procedure. S231 to S239 illustrated in FIG. 18 are the same processing as S201 to S209 illustrated in FIG. 17, and thus a description thereof will be omitted.

Note that, in the present operation example, the source gNB 100A finds only the target gNB 100B based on the measurement report received from the terminal 200. Therefore, the source gNB 100A transmits a CHO request to the target gNB 100B (S231), and receives a CHO request ACK including the configuration information of the candidate target cell from the target gNB 100B (S233).

In a case where the source gNB 100A finds the target gNB 100C present around the source gNB 100A after receiving a HO cancellation from the target gNB 100B, the source gNB 100A transmits a CHO request to the target gNB 100C (S241).

When the target gNB 100C receives the CHO request from the source gNB 100A, the target gNB 100C transmits, to the source gNB 100A, a CHO request ACK including the configuration information of the candidate target cell subordinate to the target gNB 100C (S243).

When the source gNB 100A receives a HO cancellation from the target gNB 100B and receives a CHO request ACK from the target gNB 100C, the source gNB 100A notifies the terminal 200 of the modification of the configuration information of the candidate target cell by using RRC Reconfiguration after receiving RRC Reconfiguration Complete1 from the terminal 200 in S235a (S245).

Specifically, the source gNB 100A deletes the configuration information of the candidate target cell subordinate to the target gNB 100B, and includes, in RRC Reconfiguration, the CHO configuration including the configuration information of the candidate target cell subordinate to the target gNB 100C.

When the terminal 200 receives RRC Reconfiguration from the source gNB 100A, the terminal 200 immediately transmits RRC Reconfiguration Complete1 to the source gNB 100A (S245a). The terminal 200 applies the CHO configuration including the configuration information of the candidate target cell subordinate to the target gNB 100C based on the reception of RRC Reconfiguration.

In a case where the terminal 200 judges that the transition condition to the candidate target cell is satisfied due to a movement of the terminal 200 or the like, the terminal 200 determines to start a handover (HO) to the candidate target cell without receiving a handover command from the source gNB 100A (S247). In the present embodiment, the terminal 200 determines to start the HO to the candidate target cell subordinate to the target gNB 100C.

When the terminal 200 determines the start of the HO to the candidate target cell subordinate to the target gNB 100C, the terminal 200 performs a random access (RA) procedure between the target gNB 100C and the terminal 200, and establishes synchronization between the target gNB 100C and the terminal 200 (S249). Thereby, the terminal 200 is connected to the target gNB 100C.

When the terminal 200 is connected to the target gNB 100C, the terminal 200 transmits RRC Reconfiguration Complete2 or RRC Setup Complete to the target gNB 100C (S251).

(3.5) HO Modification in Conditional HO Procedure

Next, a HO modification in the Conditional HO procedure will be described. In this operation, a target gNB instructs a source gNB to modify configuration information of a candidate target cell after transmitting the configuration information of the candidate target cell to the source gNB. In the present embodiment, the target gNB 100B instructs the source gNB 100A to modify the configuration information of the candidate target cell.

(3.5.1) Operation Example 1

First, Operation Example 1 of a HO modification in the Conditional HO procedure will be described. FIG. 19 is a diagram illustrating a HO modification sequence (Operation Example 1) in the Conditional HO procedure. S301, S303, and S309 to S315 illustrated in FIG. 19 are the same processing as S11, S13, and S17 to S23 illustrated in FIG. 4, and thus a description thereof will be omitted.

Note that a CHO request ACK transmitted in S303 is also referred to as a first message. A HO modification transmitted in S305 is also referred to as a second message.

As illustrated in FIG. 19, in a case where the target gNB 100B identifies a change in a state of the candidate target cell subordinate to the target gNB 100B after the transmission of the configuration information of the candidate target cell to the source gNB 100A using a CHO request ACK in S303, the target gNB 100B transmits a HO modification message (HO modification) to the source gNB 100A (S305).

Specifically, the target gNB 100B may transmit a HO modification in S305 in a case where the target gNB 100B determines that a load state is changed in the candidate target cell subordinate to the target gNB 100B and a transition condition to the candidate target cell thus needs to be changed.

Note that, in S305, the target gNB 100B may directly transmit a HO modification to the source gNB 100A. In this case, for example, Xn signaling is used for transmission of a HO modification. Alternatively, the target gNB 100B may transmit a HO modification to the source gNB 100A via the core network. In this case, for example, NG signaling is used for transmission of a HO modification.

When the source gNB 100A receives the HO modification from the target gNB 100B, the source gNB 100A modifies the configuration information of the candidate target cell subordinate to the target gNB 100B, and transmits RRC Reconfiguration including the CHO configuration to the terminal 200 (S307).

(3.5.2) Operation Example 2

Next, Operation Example 2 of a HO modification in the Conditional HO procedure will be described. FIG. 20 is a diagram illustrating a HO modification sequence (Operation Example 2) in the Conditional HO procedure. S301 to S313 illustrated in FIG. 20 are the same processing as S301 to S313 illustrated in FIG. 19, and thus a description thereof will be omitted.

As illustrated in FIG. 20, when the terminal 200 receives RRC Reconfiguration from the source gNB 100A, the terminal 200 immediately transmits RRC Reconfiguration Complete1 (S307*a*).

When the terminal 200 is connected to the target gNB 100B by the RA procedure in S313, the terminal 200 transmits RRC Reconfiguration Complete 2 or RRC Setup Complete to the target gNB 100B (S315*a*).

(3.5.3) Operation Example 3

Next, Operation Example 3 of a HO modification in the Conditional HO procedure will be described. FIG. 21 is a diagram illustrating a HO modification sequence (Operation Example 3) in the Conditional HO procedure. S301, S303, S307, S307*a*, and S309 illustrated in FIG. 21 are the same processing as S301, S303, S307, S307*a*, and S309 illustrated in FIG. 20, and thus a description thereof will be omitted.

As illustrated in FIG. 21, when the target gNB 100B identifies a change in a state of the candidate target cell subordinate to the target gNB 100B, the target gNB 100B transmits a HO modification to the source gNB 100A (S331).

When the source gNB 100A receives a HO modification from the target gNB 100B, the source gNB 100A notifies the terminal 200 of the modification of the configuration information of the candidate target cell by using RRC Reconfiguration after receiving RRC Reconfiguration Complete1 from the terminal 200 in S307*a* (S333).

Specifically, the source gNB 100A includes, in RRC Reconfiguration, a CHO configuration in which the configuration information of the candidate target cell subordinate to the target gNB 100B is modified.

When the terminal 200 receives RRC Reconfiguration from the source gNB 100A, the terminal 200 immediately transmits RRC Reconfiguration Complete1 to the source gNB 100A (S333*a*). The terminal 200 modifies the configuration information of the candidate target cell subordinate to the target gNB 100B based on the reception of RRC Reconfiguration.

In a case where the terminal 200 judges that the transition condition to the candidate target cell is satisfied due to a movement of the terminal 200 or the like, the terminal 200 determines to start a handover (HO) to the candidate target cell without receiving a handover command from the source gNB 100A (S335). In the present embodiment, the terminal 200 determines to start the HO to the candidate target cell subordinate to the target gNB 100B.

When the terminal 200 determines the start of the HO to the candidate target cell subordinate to the target gNB 100B, the terminal 200 performs a random access (RA) procedure between the target gNB 100B and the terminal 200, and establishes synchronization between the target gNB 100B and the terminal 200 (S337). Thereby, the terminal 200 is connected to the target gNB 100B.

When the terminal 200 is connected to the target gNB 100B, the terminal 200 transmits RRC Reconfiguration Complete2 or RRC Setup Complete to the target gNB 100B (S339).

(3.6) Configuration of RRC Reconfiguration in Conditional HO Procedure

Next, a configuration of RRC Reconfiguration in the Conditional HO procedure will be described. In this configuration, RRC Reconfiguration includes the configuration information of the candidate target cell subordinate to the target gNB 100B and the configuration information of the candidate target cell subordinate to the target gNB 100C. Note that "including plural pieces of configuration information of candidate target cells in RRC Reconfiguration" is also expressed as "encapsulating plural pieces of configuration information of a plurality of candidate target cells in RRC Reconfiguration".

Figure 22:
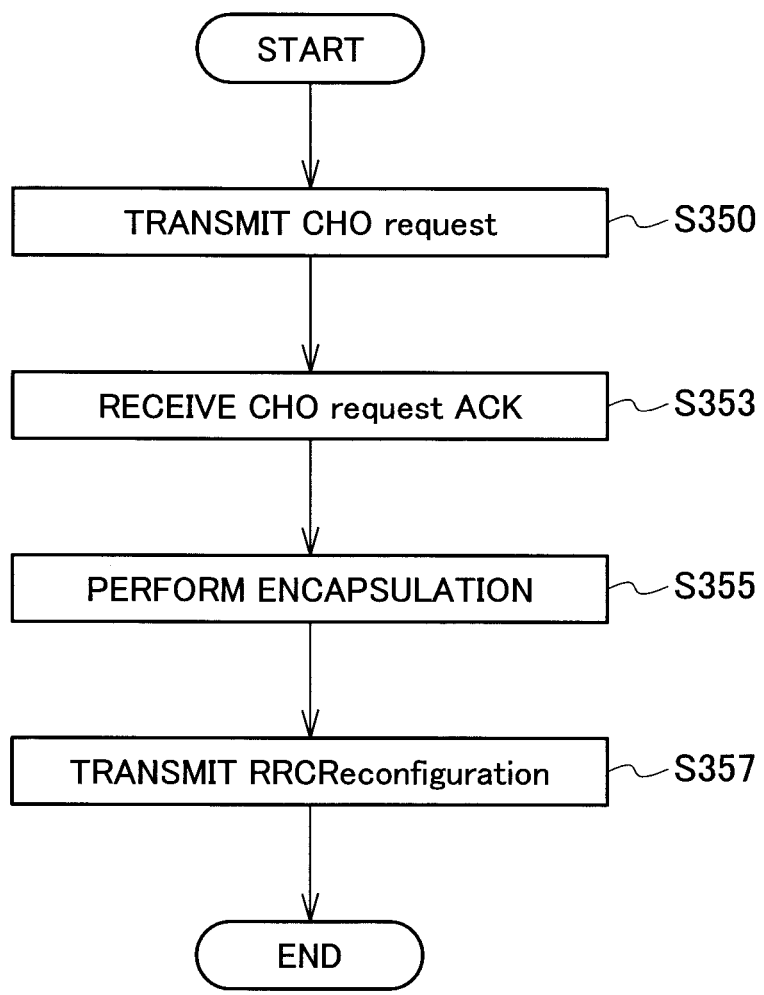
FIG. 22 is a diagram illustrating an operation flow of a gNB 100A for encapsulating plural pieces of configuration information of candidate target cells.

First, an operation flow for encapsulating plural pieces of configuration information of candidate target cells will be described. FIG. 22 is a diagram illustrating an operation flow for encapsulating plural pieces of configuration information of candidate target cells. As illustrated in FIG. 22, the source gNB 100A transmits a CHO request to the target gNBs 100B and 100C (S350).

When the source gNB 100A receives configuration information of a candidate target cell from each of the target gNBs 100B and 100C (S353), the source gNB 100A encapsulates the two pieces of configuration information of the candidate target cells into RRC Reconfiguration (S355).

When the source gNB 100A encapsulates plural pieces of configuration information of a plurality of candidate target cells in RRC Reconfiguration, the source gNB 100A transmits the RRC Reconfiguration to the terminal 200 (S357).

(3.6.1) Configuration Example 1

Figure 23:
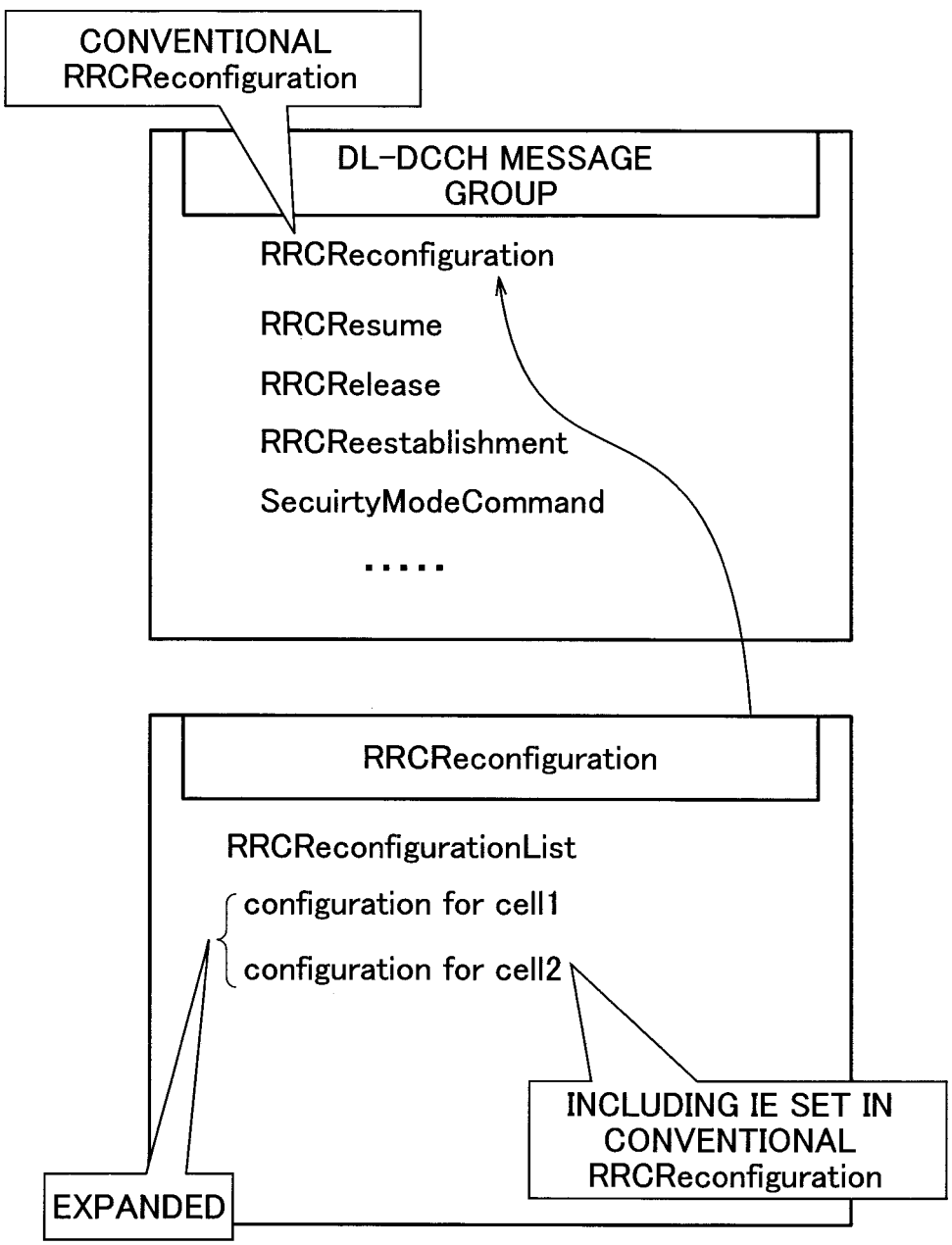
FIG. 23 is a diagram for describing a configuration (Configuration Example 1) of RRC Reconfiguration in the Conditional HO procedure.

Next, the encapsulation of the plural pieces of configuration information of the candidate target cells will be described in detail. FIG. 23 is a diagram illustrating a configuration (Configuration Example 1) of RRC Reconfiguration in the Conditional HO procedure.

As illustrated in FIG. 23, a downlink-dedicated control channel (DL-DCCH) message group includes RRC Reconfiguration, an RRC resume message (RRC Resume), an RRC release message (RRC Release), RRC Reestablishment, a security mode command (Security Mode Command), and the like.

DL-DCCH is a downlink-dedicated control channel used by the terminal 200 that has established RRC connection. The terminal 200 receives the above-described RRC message and the like on the DL-DCCH.

In this configuration example, a new information element (IE) is set in the conventional RRC Reconfiguration, and the configuration information of the candidate target cell subordinate to the target gNB 100B and the configuration information of the candidate target cell subordinate to the target gNB 100C are included in the IE.

Specifically, an RRC reconfiguration list (RRCReconfigurationList) is set as a new IE in the conventional RRC Reconfiguration, and configuration for cell1 and configuration for cell2 are set in RRCReconfigurationList. Note that the number of configuration for cells is not limited to two.

In such a configuration, when the source gNB 100A receives the configuration information of the candidate target cell subordinate to the target gNB 100B from the target gNB 100B, the source gNB 100A includes the configuration information of the candidate target cell in configuration for cell1 in RRCReconfigurationList. Similarly, when the source gNB 100A receives the configuration information of the candidate target cell subordinate to the target gNB 100C from the target gNB 100C, the source gNB 100A includes the configuration information of the candidate target cell in configuration for cell2 in RRCReconfigurationList.

Note that RRCReconfigurationList is also referred to as a CHO configuration. When the terminal 200 receives RRC Reconfiguration from the source gNB 100A, the terminal 200 acquires the configuration information of the candidate target cell subordinate to the target gNB 100B and the configuration information of the candidate target cell subordinate to the target gNB 100C from configuration for cell1 and configuration for cell2 in RRC Reconfiguration, respectively.

The configuration information of the candidate target cell may include at least one of the following information, in addition to the information on the candidate target cell and the transition condition to the candidate target cell.

Measurement condition
Configuration of candidate target cell
Security information (for example, security key update information)
Transaction identifier

(3.6.2) Configuration Example 2

Figure 24:
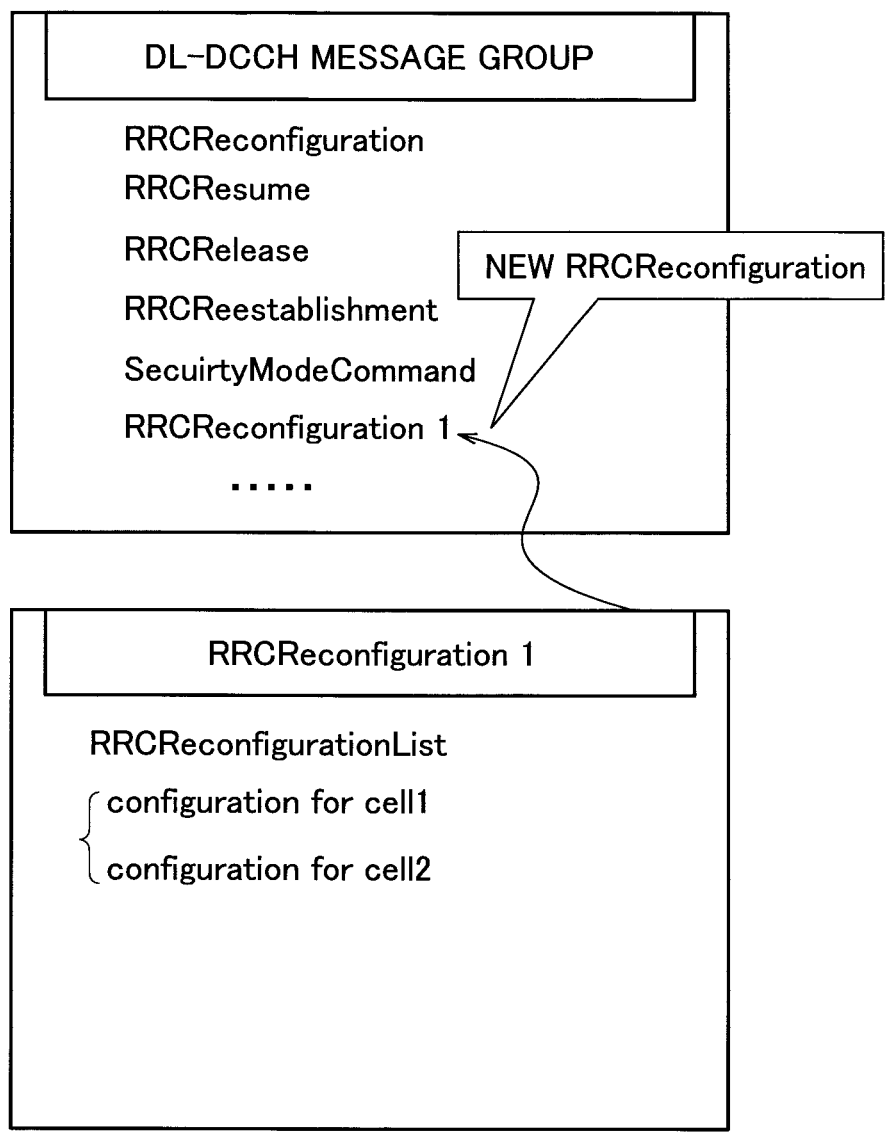
FIG. 24 is a diagram illustrating a configuration (Configuration Example 2) of RRC Reconfiguration in the Conditional HO procedure.

FIG. 24 is a diagram illustrating a configuration (Configuration Example 2) of RRC Reconfiguration in the Conditional HO procedure. As illustrated in FIG. 24, a DL-DCCH message includes RRC Reconfiguration, RRC Resume, RRC Release, RRC Reestablishment, Security Mode Command, RRC Reconfiguration1, and the like.

RRC Reconfiguration1 is a new message different from the conventional RRC Reconfiguration, and is an RRC reconfiguration message used in the Conditional HO procedure. Note that the name of the new message is not limited to RRC Reconfiguration1. In the present configuration example, the configuration information of the candidate target cell subordinate to the target gNB 100B and the configuration information of the candidate target cell subordinate to the target gNB 100C are included in an information element (IE) set in RRC Reconfiguration1.

Specifically, an RRC reconfiguration list (RRCReconfigurationList) is set in the new RRC Reconfiguration), and configuration for cell1 and configuration for cell2 are set in RRCReconfigurationList. Note that the number of configuration for cells is not limited to two.

In such a configuration, when the source gNB 100A receives the configuration information of the candidate target cell subordinate to the target gNB 100B from the target gNB 100B, the source gNB 100A includes the configuration information of the candidate target cell in configuration for cell1 in RRCReconfigurationList. Similarly, when the source gNB 100A receives the configuration information of the candidate target cell subordinate to the target gNB 100C from the target gNB 100C, the source gNB 100A includes the configuration information of the candidate target cell in configuration for cell2 in RRCReconfigurationList.

When the terminal 200 receives RRC Reconfiguration1 from the source gNB 100A, the terminal 200 acquires the configuration information of the candidate target cell subordinate to the target gNB 100B and the configuration information of the candidate target cell subordinate to the target gNB 100C from configuration for cell1 and configuration for cell2 in RRC Reconfiguration1, respectively.

(3.7) Assignment of Transaction ID in Conditional HO Procedure

Next, transaction ID assignment in the Conditional HO procedure will be described. In this operation, a source gNB or a target gNB performs assignment of a transaction ID used in the Conditional HO procedure.

(3.7.1) Operation Example 1

First, Operation Example 1 of ID assignment in the Conditional HO procedure will be described. In the present operation example, a source gNB performs assignment of a transaction ID used in the Conditional HO procedure.

Figure 25:
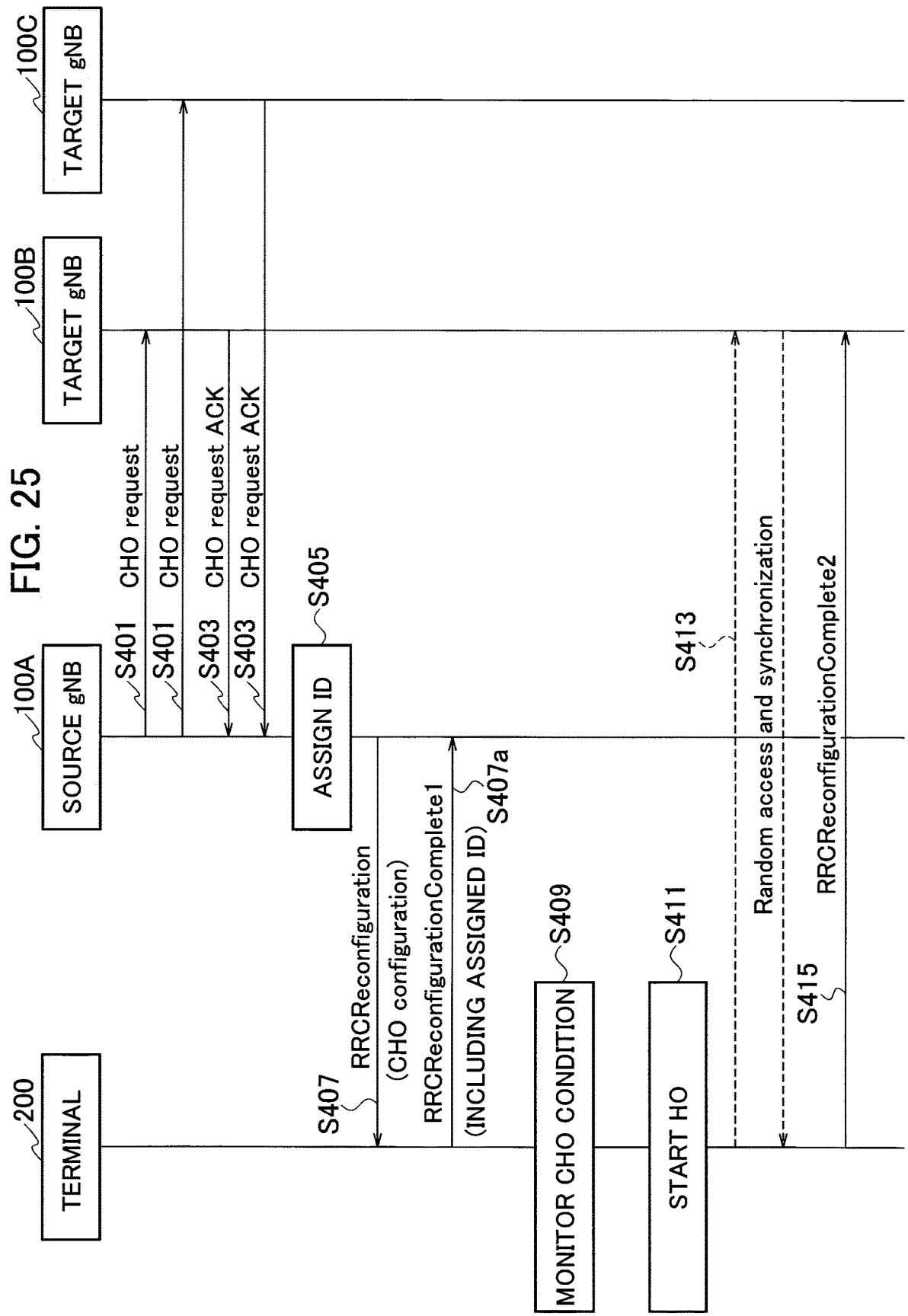
FIG. 25 is a diagram illustrating a transaction ID assignment sequence (Operation Example 1) in the Conditional HO procedure.

FIG. 25 is a diagram illustrating an ID assignment sequence (Operation Example 1) in the Conditional HO procedure. S401, S403, and S409 to S413 illustrated in FIG. 25 are the same processing as S11, S13, and S17 to S21 illustrated in FIG. 4, and thus a description thereof will be omitted.

As illustrated in FIG. 25, when the source gNB 100A receives a CHO request ACK from each of the target gNBs 100B and 100C, the source gNB 100A includes the CHO configuration in RRC Reconfiguration and assigns a transaction ID to RRC Reconfiguration (S405).

Specifically, the source gNB 100A includes, in RRCReconfigurationList in RRC Reconfiguration, identification information of the candidate target cell subordinate to the target gNB 100B and identification information of the candidate target cell subordinate to the target gNB 100C, and sets a transaction ID for a predetermined information element (IE) in RRC Reconfiguration (see FIG. 23). Note that RRCReconfigurationList is also referred to as a CHO configuration.

Note that the source gNB 100A may include, in RRCReconfigurationList in RRC Reconfiguration1 which is an RRC reconfiguration message used in the Conditional HO, the identification information of the candidate target cell subordinate to the target gNB 100B and the identification information of the candidate target cell subordinate to the target gNB 100C, and set a transaction ID for a predetermined information element (IE) in RRC Reconfiguration1 (see FIG. 24).

The transaction ID may be one of 0 to 3 or a fixed value of 0. In the present embodiment, the transaction ID is one of 0 to 3.

The source gNB 100A may assign a transaction ID to RRCReconfigurationList included in RRC Reconfiguration, that is, a group of encapsulated plural pieces of configuration information of candidate target cells, instead of assigning the transaction ID to RRC Reconfiguration.

When the source gNB 100A sets RRC Reconfiguration, the source gNB 100A transmits the RRC Reconfiguration to the terminal 200 (S407).

When the terminal 200 receives RRC Reconfiguration from the source gNB 100A, the terminal 200 immediately acquires the configuration information of the candidate target cell and transmits RRC Reconfiguration Complete1 to the source gNB 100A (S407a).

In S407a, the terminal 200 includes, in RRC Reconfiguration Complete1, the transaction ID assigned to RRC Reconfiguration received from the source gNB 100A.

The terminal 200 monitors the CHO condition (S409), starts a HO to the target gNB 100B (S411), and performs a RA procedure (S413) between the target gNB 100B and the terminal 200, and when the terminal 200 is connected to the target gNB 100B, the terminal 200 transmits RRC Reconfiguration Complete2 to the target gNB 100B (S415).

(3.7.2) Operation Example 2

Next, Operation Example 2 of ID assignment in the Conditional HO procedure will be described. In the present operation example, a target gNB performs assignment of a transaction ID to be used in the Conditional HO procedure.

Figure 26:
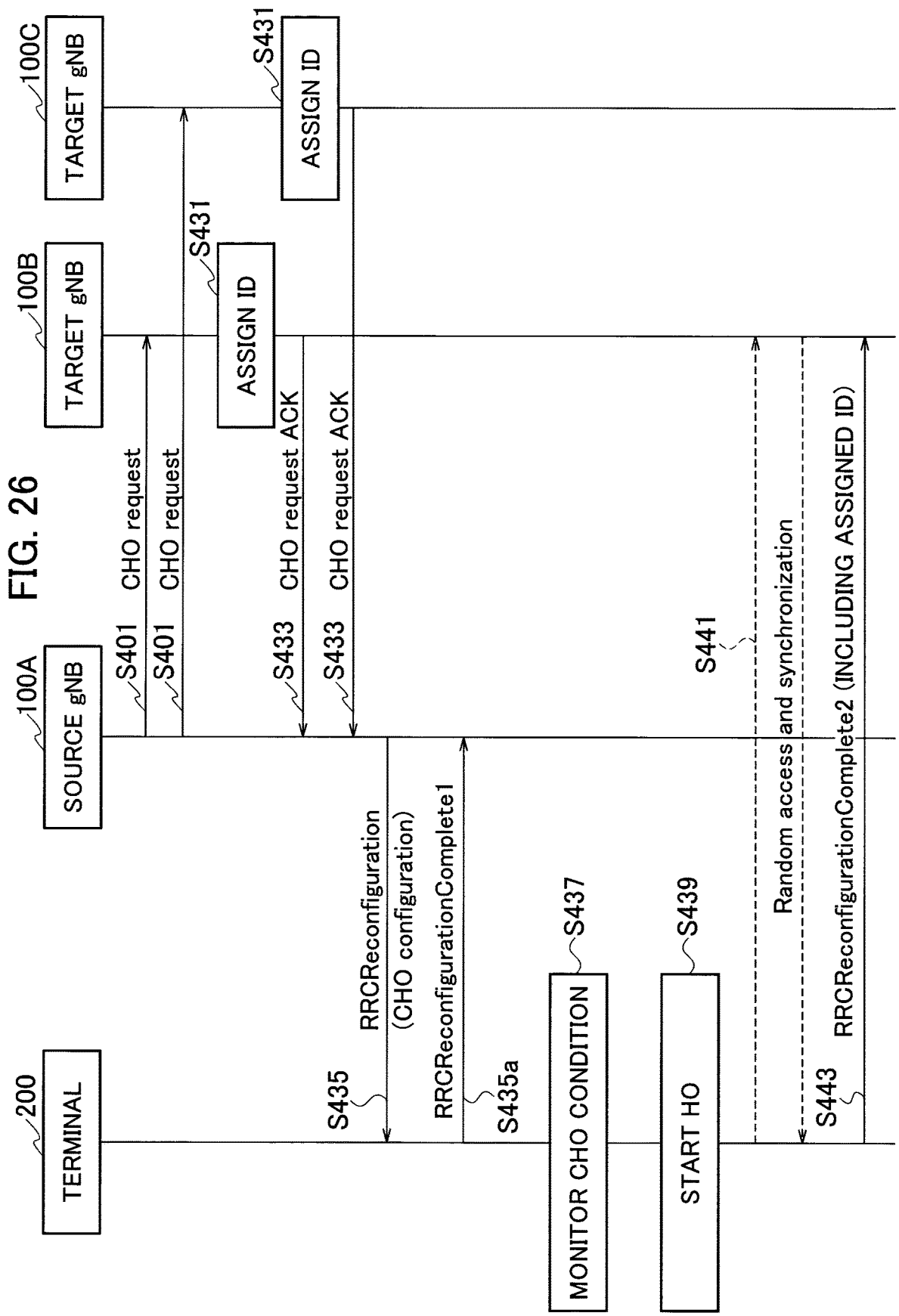
FIG. 26 is a diagram illustrating a transaction ID assignment sequence (Operation Example 2) in the Conditional HO procedure.

FIG. 26 is a diagram illustrating an ID assignment sequence (Operation Example 2) in the Conditional HO procedure. S401 and S437 to S441 illustrated in FIG. 26 are the same processing as S11 and S17 to S21 illustrated in FIG. 4, and thus a description thereof will be omitted.

As illustrated in FIG. 26, when the target gNB 100B receives the CHO request from the source gNB 100A, the target gNB 100B includes, in a CHO request ACK, the configuration information of the candidate target cell subordinate to the target gNB 100B, and assigns a transaction ID to the configuration information of the candidate target cell (S431). Specifically, the target gNB 100B includes the transaction ID in the configuration information of the candidate target cell.

Similarly, when the target gNB 100C receives the CHO request from the source gNB 100A, the target gNB 100C includes, in a CHO request ACK, the configuration information of the candidate target cell subordinate to the target gNB 100C, and assigns a transaction ID to the configuration information of the candidate target cell (S431). Specifically, the target gNB 100B includes the transaction ID in the configuration information of the candidate target cell.

The transaction ID may be one of 0 to 3 or a fixed value of 0. In the present embodiment, the transaction ID is one of 0 to 3.

When the source gNB 100A receives the CHO request ACK from each of the target gNBs 100B and 100C, the source gNB 100A includes the CHO configuration in RRC Reconfiguration. Specifically, the source gNB 100A includes, in RRCReconfigurationList in RRC Reconfiguration, the identification information of the candidate target cell subordinate to the target gNB 100B to which the transaction ID is assigned, and the identification information of the candidate target cell subordinate to the target gNB 100C to which the transaction ID is assigned (See FIG. 23). Note that RRCReconfigurationList is also referred to as the CHO configuration.

Note that the source gNB 100A may include, in RRCReconfigurationList in RRC Reconfiguration1 which is an RRC reconfiguration message used in the Conditional HO, the identification information of the candidate target cell subordinate to the target gNB 100B and the identification information of the candidate target cell subordinate to the target gNB 100C (See FIG. 24).

When the source gNB 100A sets RRC Reconfiguration, the source gNB 100A transmits the RRC Reconfiguration to the terminal 200 (S435).

When the terminal 200 receives RRC Reconfiguration from the source gNB 100A, the terminal 200 immediately acquires the configuration information of the candidate target cell and transmits RRC Reconfiguration Complete1 to the source gNB 100A (S435*a*).

The terminal 200 monitors the CHO condition (S437), starts a HO to the target gNB 100B (S439), and performs a RA procedure (S441) between the target gNB 100B and the terminal 200, and when the terminal 200 is connected to the target gNB 100B, the terminal 200 transmits RRC Reconfiguration Complete2 to the target gNB 100B (S443).

In S443, the terminal 200 includes, in RRC Reconfiguration Complete2, the transaction ID included in the configuration information of the candidate target cell subordinate to the target gNB 100B.

(3.8) Recovery from HOF in Conditional HO Procedure

Next, a recovery from an HOF in the Conditional HO procedure will be described. This operation is performed in a case where an HOF occurs when the terminal 200 receives a HO command from a source gNB during the monitoring of the CHO condition, cancels the CHO, and preferentially transitions to a target gNB. In this case, the terminal 200 maintains all or a part of configuration information of a candidate target cell subordinate to the target gNB.

Figure 27:
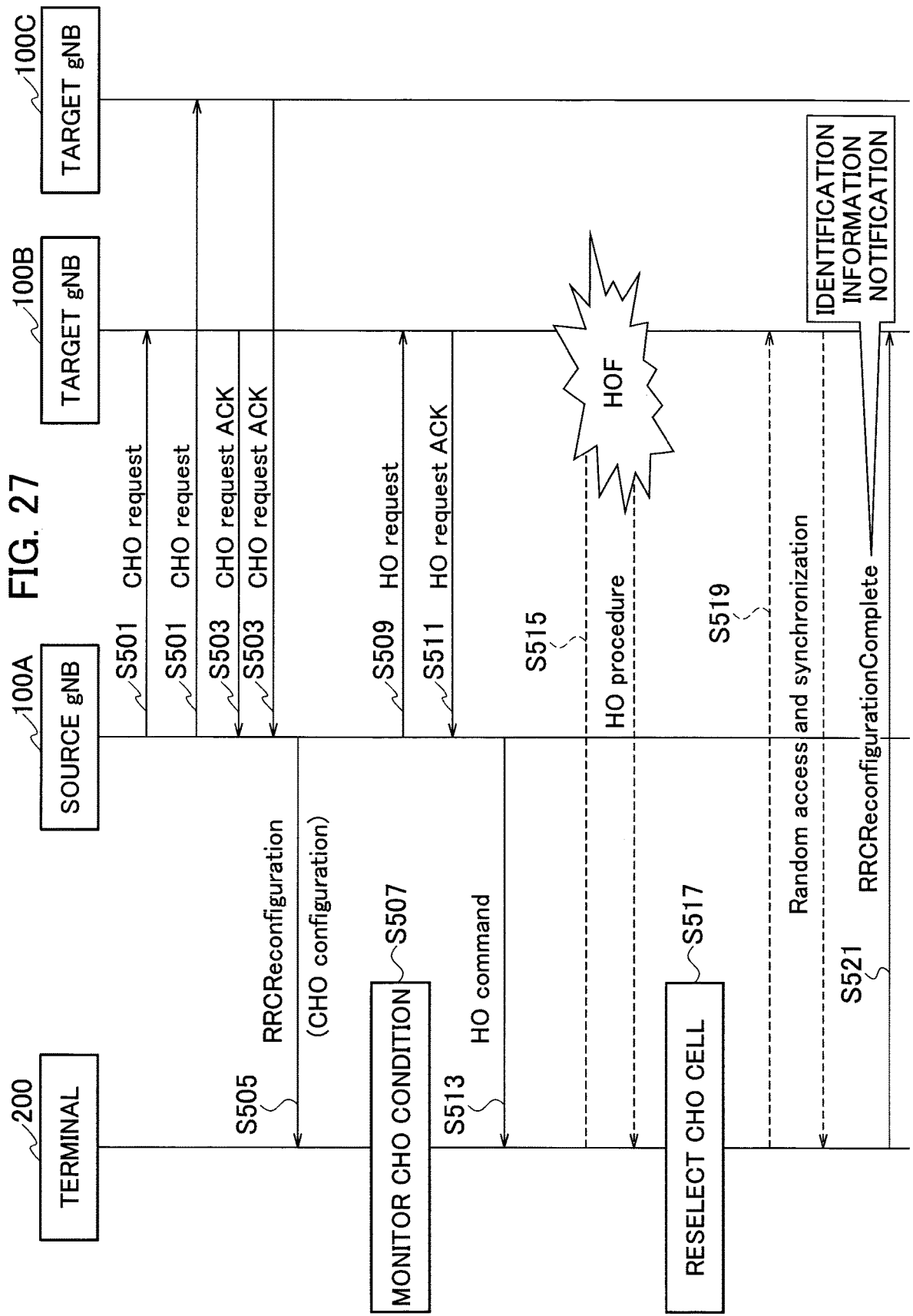
FIG. 27 is a diagram illustrating a sequence of a recovery from a handover failure (HOF) in the Conditional HO procedure.

FIG. 27 is a diagram illustrating a sequence of a recovery from an HOF in the Conditional HO procedure. S501 to S507 in FIG. 27 are the same processing as S11 to S17 in FIG. 4, and thus a description thereof will be omitted.

In a case where the source gNB 100A determines to cause the terminal 200 to preferentially transitions to the candidate target cell subordinate to the target gNB 100B, the source gNB 100A transmits a HO request to the target gNB 100B (S509). When the target gNB 100B receives the HO request from the source gNB 100A, the target gNB 100B transmits a HO request ACK to the source gNB 100A (S511).

When the source gNB 100A receives the HO request ACK from the target gNB 100B, the source gNB 100A transmits a HO command to the terminal 200 (S513). When the terminal 200 receives the HO command from the source gNB 100A during the monitoring of the CHO condition, the terminal 200 attempts to perform a handover procedure between the target gNB 100B and the terminal 200 (S515).

In a case where the handover procedure fails due to occurrence of an HOF during the handover procedure in S515, the terminal 200 reselects a candidate target cell (CHO cell) as a transition destination of which a transition condition is satisfied (S517). In the present embodiment, the terminal 200 reselects the candidate target cell subordinate to the target gNB 100B.

In S517, the terminal 200 maintains all or a part of the configuration information of the candidate target cell subordinate to the target gNB 100B. Note that "maintaining all or a part of the configuration information of the candidate target cell" can also be expressed as "considering that all or a part of the configuration information of the candidate target cell is applicable" or "considering that all or a part of the configuration information of the candidate target cell is valid".

In S517, the information maintained by the terminal 200 in the configuration information of the candidate target cell is, for example, security information. Note that in a case where the target gNB 100B acquires the identification information of the terminal 200 in advance, the information maintained by the terminal 200 may be the identification information of the terminal 200.

Examples of the identification information of the terminal 200 include the following information.

Short media access control identifier (short MAC-ID) Cell radio network temporary identifier (C-RNTI) Implicit radio network temporary identifier (I-RNTI) When the terminal 200 reselects the candidate target cell subordinate to the target gNB 100B, the terminal 200 performs a random access (RA) procedure between the target gNB 100B and the terminal 200, and establishes synchronization between the target gNB 100B and the terminal 200 (S519). Thereby, the terminal 200 is connected to the target gNB 100B.

When the terminal 200 is connected to the target gNB 100B, the terminal 200 transmits an RRC reconfiguration complete message (RRC Reconfiguration Complete) to the target gNB 100B (S521).

In S521, the terminal 200 may include, in RRC Reconfiguration Complete, all or a part of the configuration information of the candidate target cell maintained in S517, and transmit, to the target gNB 100B, RRC Reconfiguration Complete by using a signaling radio bearer 1 (SRB1). The terminal 200 may include, in an RRC Reestablishment request, all or part of the configuration information of the candidate target cell maintained in S517 and transmit the RRC Reestablishment request to the target gNB 100B by using a signaling radio bearer 0 (SRB0), instead of the SRB1.

Note that the SRB0 is a radio bearer for a common control channel (CCCH). The SRB1 is a radio bearer for a dedicated control channel (DCCH).

Further, in S521, the terminal 200 may include, in RRC Reconfiguration Complete, information indicating that all or a part of the configuration information of the candidate target cell is maintained, and transmit RRC Reconfiguration Complete to the target gNB 100B.

Furthermore, in S521, the terminal 200 may include, in RRC Reconfiguration Complete, information that can be converted one-to-one with the configuration information of the candidate target cell maintained in S517, and transmit RRC Reconfiguration Complete to the target gNB 100B.

Thereby, for example, the security information or the identification information of the terminal 200 is shared between the terminal 200 and the target gNB 100B. Therefore, the target gNB 100B can determine whether or not the terminal 200 is a terminal permitted to transition to the target gNB 100B.

Note that application of this operation is not limited to the case where an HOF occurs when the terminal 200 receives a HO command from a source gNB during the monitoring of the CHO condition, cancels the CHO, and preferentially transitions to a target gNB. For example, this operation can be applied even in a case where an HOF occurs when the terminal 200 monitors the CHO condition, a transition condition to a candidate target cell subordinate to the target gNB is satisfied, and a HO is performed to the candidate target cell without receiving the HO command from the source gNB.

(3.9) Resumption of Radio Bearer after RLF in Conditional HO Procedure

Next, resumption of a radio bearer after an RLF in the Conditional HO procedure will be described. In this operation, in a case where the terminal 200 is reconnected to a target gNB in the condition HO procedure, the terminal 200 resumes radio bearers suspended due to occurrence of an RLF, based on a specific condition.

Note that the radio bearers include a signaling radio bearer (SRB) and a data radio bearer (DRB). The SRB is for control plane data, and the DRB is for user plane data. In addition, SRB0, SRB1, SRB2, or SRB3 can be configured as the SRB according to the use.

The SRB0 is a radio bearer for CCCH. The SRB1 to SRB3 are radio bearers for DCCH. The DRB is a radio bearer for user data.

The SRB1 is used for transmitting and receiving RRC messages and NAS messages before the SRB2 is established.

The SRB2 is used for transmitting and receiving NAS messages, has a lower priority than that of the SRB1, and is configured by the network after activation of AS security.

The SRB3 is used for transmitting and receiving a specific RRC message in E-UTRA-NR Dual Connectivity (EN-DC).

In the present embodiment, in a case where an RLF is detected when the terminal 200 transitions to the target gNB 100B by using the configuration information of the candidate target cell subordinate to the target gNB 100B, the terminal 200 suspends all radio bearers except for the SRB0 between the target gNB 100B and the terminal 200, and is reconnected to the target gNB 100B.

Figure 28:
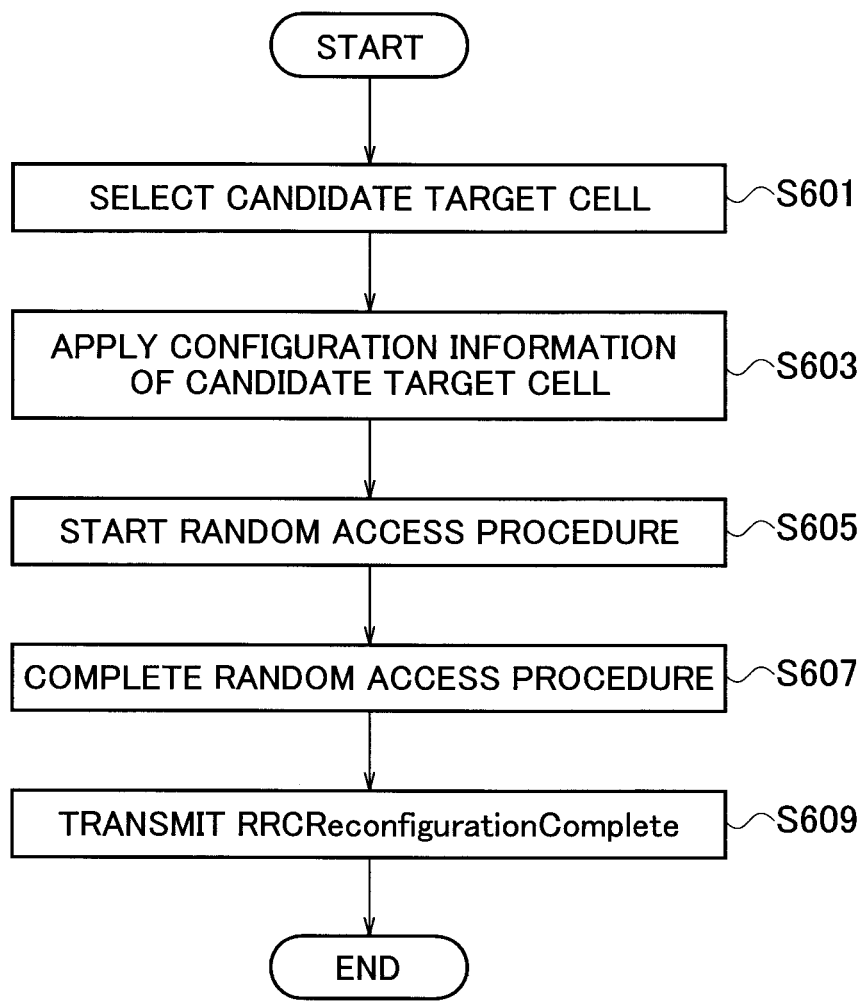
FIG. 28 is a diagram illustrating an operation flow of the terminal 200 that resumes a radio bearer after the radio link failure (RLF) in the Conditional HO procedure.

FIG. 28 is a diagram illustrating an operation flow of the terminal 200 that resumes a radio bearer after the RLF in the Conditional HO procedure. FIG. 29 is a view illustrating conditions for resuming a radio bearer after the RLF in the Conditional HO procedure.

As illustrated in FIG. 28, the terminal 200 reselects a CHO cell in the Conditional HO procedure (S601). Specifically, the terminal 200 reselects a candidate target cell (CHO cell) as a transition destination of which a transition condition is satisfied. In the present embodiment, the terminal 200 reselects the candidate target cell subordinate to the target gNB 100B.

When the terminal 200 reselects the candidate target cell subordinate to the target gNB 100B, the terminal 200 starts transition to the target gNB 100B based on the configuration information of the candidate target cell (S603). In this case, all radio bearers suspended between the target gNB 100B and the terminal 200 may be resumed (Condition A in FIG. 29).

The terminal 200 starts a random access (RA) procedure between the target gNB 100B and the terminal 200 with the transition to the target gNB 100B (S605). In this case, all radio bearers suspended between the target gNB 100B and the terminal 200 may be resumed (Condition B in FIG. 29).

When the RA procedure between the target gNB 100B and the terminal 200 is completed (S607), the terminal 200 establishes synchronization between the target gNB 100B and the terminal 200. Thereby, the terminal 200 is connected to the target gNB 100B. In this case, all radio bearers suspended between the target gNB 100B and the terminal 200 may be resumed (Condition C in FIG. 29).

Note that, in a case where the terminal 200 receives an RRC message giving an instruction to resume the radio bearers from the network in S601 to S607, the terminal 200 may resume all the radio bearers suspended between the target gNB 100B and the terminal 200 (Condition D in FIG. 29).

In this case, the terminal 200 may notify the network that the resumption of the radio bearers is completed by using an RRC resume complete message (RRC Resume Complete).

When the terminal 200 is connected to the target gNB 100B, the terminal 200 transmits RRC Reconfiguration Complete to the target gNB 100B (S609).

(4) ACTION/EFFECT

According to the embodiment described above, the terminal 200 receives, from the source gNB 100A, the configuration information of the candidate target cell subordinate to the target gNB 100B. The terminal 200 performs a procedure for transition to the target gNB 100B based on the configuration information of the candidate target cell without performing a reestablishment procedure (RRC reestablishment procedure) when a radio link failure (RLF) occurs. The terminal 200 resumes a radio bearer suspended between the terminal 200 and the target gNB 100B in a case of performing the procedure for transition to the target gNB 100B based on the configuration information of the candidate target cell.

With such a configuration, at the time of a recovery from the RLF, the terminal 200 can transmit a message to the target gNB 100B early.

According to the embodiment described above, the terminal 200 receives, from the source gNB 100A, the configuration information of the candidate target cell subordinate to the target gNB 100B. The terminal 200 performs a procedure for transition to the target gNB 100B based on the configuration information of the candidate target cell without performing a reestablishment procedure (RRC reestablishment procedure) when a radio link failure (RLF) occurs. In the procedure for transition to the target gNB 100B, the terminal 200 resumes a radio bearer suspended between the terminal 200 and the target gNB 100B when performing the random access procedure (RA procedure).

Also with such a configuration, at the time of a recovery from the RLF, the terminal 200 can transmit a message to the target gNB 100B early.

According to the embodiment described above, the terminal 200 receives, from the source gNB 100A, the configuration information of the candidate target cell subordinate to the target gNB 100B. The terminal 200 performs a procedure for transition to the target gNB 100B based on the configuration information of the candidate target cell without performing a reestablishment procedure (RRC reestablishment procedure) when a radio link failure (RLF) occurs. In the procedure for transition to the target gNB 100B, in a case where the terminal 200 receives a message giving an instruction to resume a radio bearer, the terminal 200 resumes a radio bearer suspended between the terminal 200 and the target gNB 100B.

Also with such a configuration, at the time of a recovery from the RLF, the terminal 200 can transmit a message to the target gNB 100B early.

(5) OTHER EMBODIMENTS

Although the contents of the present invention have been described according to the embodiment, the present invention is not limited to these descriptions, and it is obvious to those skilled in the art that various modifications and improvements can be made thereto.

For example, in the embodiment described above, the NR has been described as an example. However, the Conditional HO can also be applied to LTE, and the same operation may be performed in the LTE.

The block diagrams (FIGS. 2 and 3) used for describing the above-described embodiment illustrate blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as described above, the realization method is not particularly limited to any one method.

Figure 30:
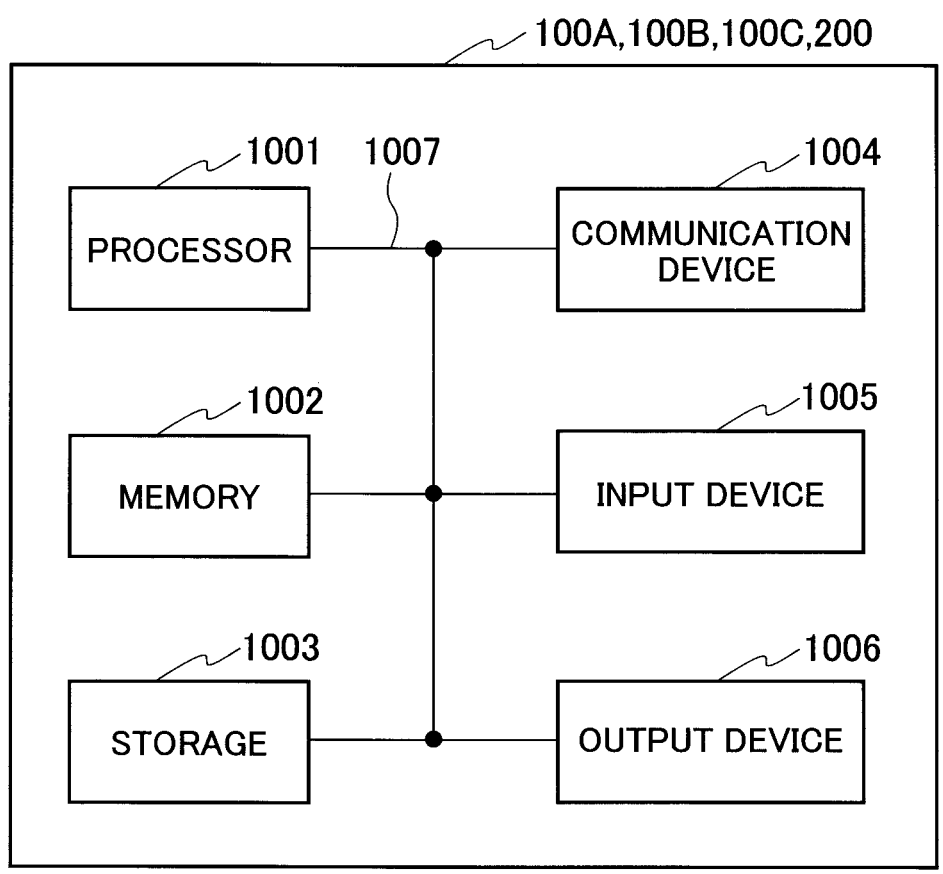
FIG. 30 is a diagram illustrating an example of a hardware configuration of each of the gNBs 100A, 100B, 100C, and the terminal 200.

Furthermore, the gNBs 100A, 100B, and 100C, and the terminal 200 described above may function as a computer that performs the processing of the radio communication method of the present disclosure. FIG. 30 is a diagram illustrating an example of a hardware configuration of the device. As illustrated in FIG. 30, the device can be configured as a computer device including a processor 1001, a memory 1002, a storage 1003, a communication device 1004, an input device 1005, an output device 1006, a bus 1007, and the like.

Furthermore, in the following description, the term "device" can be replaced with a circuit, device, unit, and the like. A hardware configuration of the device may be constituted by including one or plurality of the devices illustrated in the figure, or may be constituted without including some of the devices.

Each functional block of the device is realized by any of hardware elements of the computer device or a combination of the hardware elements.

Moreover, the processor 1001 performs operation by loading predetermined software (computer program) on hardware such as the processor 1001 and the memory 1002, and realizes various functions of the device by controlling communication via the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a computer program (computer program code), a software module, data, and the like from at least one of the storage 1003 and the communication device 1004 into the memory 1002, and executes various processing according to them. As the computer program, a computer program that is capable of executing on the computer at least a part of the operation described in the above embodiments, is used. Alternatively, various processing described above may be executed by one processor 1001 or may be executed simultaneously or sequentially by two or more processors 1001. The processor 1001 may be implemented by using one or more chips. Alternatively, the computer program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, and a Blu-ray (Registered Trademark) disk), a smart card, a flash memory (for example, a card, a stick, and a key drive), a floppy (Registered Trademark) disk, a magnetic strip, and the like. The storage 1003 may be called an auxiliary storage device. The recording medium can be, for example, a database including at least one of the memory 1002 and the storage 1003, a server, or other appropriate media.

The communication device 1004 is hardware (transmission and reception device) capable of performing communication between computers via at least one of a wired network and wireless network. The communication device 1004 is also called, for example, a network device, a network controller, a network card, a communication module, or the like.

The communication device 1004 may include a radio-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these kinds of hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination of these. The RRC signaling may be called RRC message, for example, or may be an RRC Connection Setup message, an RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input and output information can be stored in a specific location (for example, a memory) or may be managed in a management table. The information to be input and output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote sources by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

Note that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure can be used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (Remote Radio Head: RRH)).

The term "cell" or "sector" refers to a part or all of the coverage area of at least one of a base station and a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable terms.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter, the same applies). For example, each of the aspects/embodiments of the present disclosure may be applied to a configuration that allows communication between a base station and a mobile station to be replaced with a communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

A radio frame may be configured with one or more frames in time domain. One frame or each of a plurality of frames in the time domain may be called a subframe.

Further, the subframe may be configured with one or more slots in the time domain. The subframe may be a fixed time length (for example, 1 ms) that does not depend on numerology.

The numerology may be a communication parameter applied to at least one of transmission or reception of a certain signal or channel. The numerology may represent, for example, at least one of a subcarrier spacing (SCS), a bandwidth, a symbol length, a cyclic prefix length, a Transmission Time Interval (TTI), the number of symbols per TTI, a radio frame configuration, specific filtering processing performed by a transceiver in the frequency domain, or specific windowing processing performed by the transceiver in the time domain.

The slot may be configured with one or more symbols (Orthogonal Frequency Division Multiplexing (OFDM) symbols, Single Carrier Frequency Division Multiple Access (SC-FDMA) symbols, and the like) in the time domain. The slot may be a unit of time based on the numerology.

The slot may include a plurality of minislots. Each minislot may be configured with one or more symbols in the time domain. Further, the minislot may also be called a subslot. The minislot may be configured with fewer symbols than those of slots. A PDSCH (or PUSCH) transmitted in a time unit larger than the minislot may be called a PDSCH (or PUSCH) mapping type A. A PDSCH (or PUSCH) transmitted using the minislot may be called a PDSCH (or PUSCH) mapping type B.

Each of the radio frame, subframe, slot, minislot, and symbol represents a time unit for transmitting a signal. Different names may be used for the radio frame, subframe, slot, minislot, and symbol, respectively.

For example, one subframe may be called a transmission time interval (TTI), a plurality of consecutive subframes may be called a TTI, and one slot or one minislot may be called a TTI. That is, at least one of the subframe or the TTI may be a subframe (1 ms) in the existing LTE, a period shorter than 1 ms (for example, 1 to 13 symbols), or a period longer than 1 ms. Note that a unit representing the TTI may also be called a slot, a minislot, or the like, instead of a subframe.

Here, the TTI refers to a minimum time unit of scheduling in radio communication, for example. For example, in the LTE system, a base station performs scheduling to allocate radio resources (frequency bandwidth, transmission power, or the like that can be used in each user terminal) to each user terminal in units of TTI. Note that the definition of the TTI is not limited thereto.

The TTI may be a transmission time unit such as a channel-encoded data packet (transport block), a code block, or a code word, or may be a processing unit of scheduling, link adaptation, or the like. Note that, when a TTI is given, a time interval (for example, the number of symbols) in which a transport block, a code block, a code word, or the like is actually mapped may be shorter than the TTI.

Note that, in a case where one slot or one minislot is called a TTI, one or more TTIs (that is, one or more slots or one or more minislots) may be a minimum time unit of scheduling. Further, the number of slots (the number of minislots) constituting the minimum time unit of the scheduling may be controlled.

A TTI having a time length of 1 ms may be called a normal TTI (TTI in LTE Rel. 8 to 12), a normal TTI, a long TTI, a normal subframe, a long subframe, a slot, or the like. A TTI shorter than the normal TTI may be called a shortened TTI, a short TTI, a partial TTI (partial or fractional TTI), a shortened subframe, a short subframe, a minislot, a subslot, a slot, or the like.

Note that the long TTI (for example, the normal TTI, the subframe, or the like) may be read as a TTI having a time length exceeding 1 ms, and the short TTI (for example, the shortened TTI or the like) may be read as a TTI having a TTI length of less than the TTI length of the long TTI and equal to or more than 1 ms.

The resource block (RB) is a resource allocation unit in the time domain and the frequency domain, and may include one or more consecutive subcarriers in the frequency domain. The number of subcarriers included in the RB may be the same regardless of the numerology, for example, twelve. The number of subcarriers included in the RB may be determined based on the numerology.

Further, the time domain of the RB may include one or more symbols, and may have a length of one slot, one minislot, one subframe, or one TTI. One TTI, one subframe, or the like may be configured with one or a plurality of resource blocks.

Note that one or more RBs may be called a physical resource block (Physical RB: PRB), a subcarrier group (SubCarrier Group: SCG), a resource element group (Resource Element Group: REG), a PRB pair, an RB pair, or the like.

Further, the resource block may be configured with one or more resource elements (RE). For example, one RE may be a radio resource region of one subcarrier and one symbol.

The bandwidth part (BWP) (which may be called a partial bandwidth, or the like) may represent a subset of continuous common resource blocks (RBs) for certain numerology in a certain carrier. Here, the common RB may be specified by an index of RB based on a common reference point of the carriers. The PRB may be defined in a certain BWP and numbered within the BWP.

The BWP may include a BWP (UL BWP) for UL and a BWP (DL BWP) for DL. One or more BWPs may be configured in one carrier for a UE.

At least one of the configured BWPs may be active, and the UE may not assume that a predetermined signal/channel is transmitted and received outside the active BWP. Note that "cell", "carrier", and the like in the present disclosure may be read as "BWP".

The above-described structures such as a radio frame, a subframe, a slot, a minislot, and a symbol are merely examples. For example, the configuration such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, and a cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, printed electrical connections, and as some non-limiting and non-exhaustive examples, by using electromagnetic energy having wavelengths in the radio frequency domain, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in any other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles may include a plurality of nouns following these articles.

The terms "determining" and "determining" used in the present disclosure may encompass a wide variety of operations. The terms "determining" and "deciding" can include, for example, judging, calculating, computing, processing, deriving, investigating, looking up (search or inquiry) (for example, searching in a table, database, or other data structure), and ascertaining. In addition, the terms "determining" and "deciding" can include receiving (for example, receiving information), transmitting (for example, transmitting information), inputting, outputting, and accessing (for example, accessing data in a memory), and the like. In addition, the terms "determining" and "deciding" can include "resolving", "selecting", "choosing", "establishing", "comparing", and the like. In other words, the terms "determining" and "deciding" can include any operation. Further, the term "determining (deciding)" may also be read as "assuming", "expecting", "considering", and the like.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

In a case of the above-described terminal, the terminal can resume a radio bearer suspended between the terminal and a target radio base station even in a case where the terminal transitions to the target radio base station without performing a reestablishment procedure when a radio link failure occurs, which is useful.

EXPLANATION OF REFERENCE NUMERALS

10 Radio communication system
100A, 100B, 100C gNB
110 Transmitting unit
120 Receiving unit
130 Retaining unit
140 Control unit
200 Terminal
210 Transmitting unit
220 Receiving unit
230 Retaining unit
240 Control unit
1001 Processor
1002 Memory
1003 Storage
1004 Communication device
1005 Input device
1006 Output device
1007 Bus

The invention claimed is:

1. A terminal comprising:
a receiver that receives, from a source radio base station, information on a candidate cell and a transition condition to the candidate cell; and
a processor that performs a synchronization with the candidate cell based on the transition condition and performs a transition to a target radio base station which configures the information on the candidate cell, when a radio link failure is detected,
wherein the processor resumes a radio bearer suspended between the terminal and the target radio base station due to the radio link failure in a case of performing the transition to the target radio base station.

2. A terminal comprising:
a receiver that receives, from a source radio base station, information on a candidate cell and a transition condition to the candidate cell; and
a processor that performs a synchronization with the candidate cell based on the transition condition and performs a transition to a target radio base station which configures the information on the candidate cell, without transmitting a re-establishment request message, when a radio link failure is detected,
wherein the processor resumes a radio bearer suspended between the terminal and the target radio base station due to the radio link failure in a case of performing the synchronization with the candidate cell.

3. A radio communication system comprising:
a source radio base station and a terminal,
wherein the source radio base station includes a transmitter that transmits, to the terminal, information on a candidate cell and a transition condition to the candidate cell, and
the terminal includes:
a receiver that receives the information on the candidate cell and the transition condition to the candidate cell; and
a processor that performs a synchronization with the candidate cell based on the transition condition and performs a transition to a target radio base station which configures the information on the candidate cell, without transmitting a re-establishment request message, when a radio link failure is detected,
wherein the processor resumes a radio bearer suspended between the terminal and the target radio base station due to the radio link failure in a case of performing the synchronization with the candidate cell.

4. A radio communication method comprising:
transmitting to a terminal, by a source radio base station, information on a candidate cell and a transition condition to the candidate cell;
receiving, by the terminal, the information on the candidate cell and the transition condition to the candidate cell;
performing, by the terminal, a synchronization with the candidate cell based on the transition condition and performing, by the terminal, a transition to a target radio base station which configures the information on the candidate cell, without transmitting a re-establishment request message, when a radio link failure is detected; and
resuming, by the terminal, a radio bearer suspended between the terminal and the target radio base station due to the radio link failure in a case of performing the synchronization with the candidate cell.

* * * * *